(12) United States Patent
Mizusaki et al.

(10) Patent No.: US 11,053,354 B2
(45) Date of Patent: Jul. 6, 2021

(54) LIQUID CRYSTAL DISPLAY DEVICE

(71) Applicant: SHARP KABUSHIKI KAISHA, Sakai (JP)

(72) Inventors: Masanobu Mizusaki, Sakai (JP); Yuko Teraoka, Sakai (JP); Tsuyoshi Okazaki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 90 days.

(21) Appl. No.: 16/459,379

(22) Filed: Jul. 1, 2019

(65) Prior Publication Data
US 2020/0024399 A1 Jan. 23, 2020

Related U.S. Application Data

(60) Provisional application No. 62/702,112, filed on Jul. 23, 2018.

(51) Int. Cl.
*C08G 73/10* (2006.01)
*G02F 1/1337* (2006.01)

(52) U.S. Cl.
CPC ..... *C08G 73/1042* (2013.01); *C08G 73/1078* (2013.01); *G02F 1/133723* (2013.01);
(Continued)

(58) Field of Classification Search
CPC ......... G02F 1/133723; G02F 1/133753; G02F 1/13378; G02F 1/133788; G02F 2001/133765; C08G 73/1042; C08G 73/1037; C09K 2323/00; C09K 2323/027; C09K 2323/02
(Continued)

(56) References Cited

U.S. PATENT DOCUMENTS

2003/0086044 A1 5/2003 Inoue et al.
2005/0253988 A1 11/2005 Inoue et al.
(Continued)

FOREIGN PATENT DOCUMENTS

JP 2003-177418 A 6/2003
WO 2011/001579 A1 1/2011
WO 2014/038431 A1 3/2014

*Primary Examiner* — Ruiyun Zhang
(74) *Attorney, Agent, or Firm* — ScienBiziP, P.C.

(57) ABSTRACT

The present invention provides a liquid crystal display device with a high degree of freedom in molecular structure design of an alignment film and with reduced image sticking. The liquid crystal display device includes a pair of substrates; a liquid crystal layer held between the substrates; an alignment film disposed on a liquid crystal layer side surface of at least one of the substrates; and a polymer layer disposed between the liquid crystal layer and the alignment film, the alignment film containing a first polymer containing at least one structure represented by the following formula (1) in a side chain,

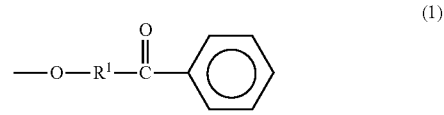

(1)

wherein $R^1$ represents a C3-C6 branched or cyclic alkylene group, and a hydrogen atom at a para position to a carbonyl group in the phenyl group is optionally replaced.

9 Claims, 2 Drawing Sheets

(52) U.S. Cl.
CPC .... *G02F 1/133753* (2013.01); *C09K 2323/00* (2020.08); *C09K 2323/02* (2020.08)

(58) Field of Classification Search
USPC ................ 428/1.1, 1.2, 1.25, 1.26; 349/123; 528/341, 340
See application file for complete search history.

(56) References Cited

U.S. PATENT DOCUMENTS

| | | |
|---|---|---|
| 2012/0092603 A1 | 4/2012 | Mizusaki et al. |
| 2015/0234236 A1 | 8/2015 | Ohnishi et al. |

LIQUID CRYSTAL DISPLAY DEVICE

CROSS-REFERENCE TO RELATED APPLICATIONS

The present application claims priority under 35 U.S.C. § 119 to U.S. Provisional Patent Application No. 62/702,112 filed on Jul. 23, 2018, the contents of which are incorporated herein by reference in their entirety.

BACKGROUND OF THE INVENTION

Field of the Invention

The present invention relates to liquid crystal display devices. More specifically, the present invention relates to a liquid crystal display device that controls the alignment of liquid crystal molecules using a polymer layer formed by polymerizing monomers in a liquid crystal composition (hereinafter, also referred to as a polymer sustained alignment (PSA) layer).

Description of Related Art

Liquid crystal display devices (LCDs) control the alignment of liquid crystal molecules with birefringence to control transmission/blocking of light (on/off of display). Liquid crystal display devices are in a liquid crystal alignment mode such as the twisted nematic (TN) mode aligning liquid crystal molecules having positive anisotropy of dielectric constant such that the alignment is twisted by 90° as viewed from the direction normal to the substrates; the vertical alignment (VA) mode aligning liquid crystal molecules having negative anisotropy of dielectric constant in the direction perpendicular to the substrate surfaces; or the in-plane switching (IPS) or fringe field switching (FFS) mode aligning liquid crystal molecules having positive or negative anisotropy of dielectric constant in the direction parallel to the substrate surfaces and generating transverse electric fields in the liquid crystal layer.

Liquid crystal display devices include an alignment film on a substrate to cause interaction between the side chains of the alignment film and liquid crystal molecules, thereby defining the initial alignment azimuth of the liquid crystal molecules. A technique recently drawing attention is one forming a polymer layer (PSA layer) on an alignment film through polymerization of monomers in a liquid crystal composition so as to control the alignment of the liquid crystal molecules. The PSA layer is formed by injecting between the substrates a liquid crystal composition obtained by mixing a polymerizable component (hereinafter, also referred to as a polymerizable monomer) such as a monomer or an oligomer into a liquid crystal material, and then applying heat or light (e.g., ultraviolet light) to the polymerizable monomer to polymerize the monomer.

Other PSA techniques studied include a method adding a polymerization initiator as well as the polymerizable monomer to the liquid crystal composition (e.g., JP 2003-177418 A), and a method forming an alignment film having a functional group capable of initiating the polymerization reaction of the polymerizable monomer on a substrate of the liquid crystal display device without adding a polymerization initiator to the liquid crystal composition (e.g., WO 2011/001579 and WO 2014/0038431).

BRIEF SUMMARY OF THE INVENTION

A polymerizable monomer can be polymerized by, for example, irradiating the liquid crystal layer containing the polymerizable monomer with ultraviolet light. To shorten the takt time, the ultraviolet light irradiation duration required for polymerization of the polymerizable monomer is preferably short. Short ultraviolet light irradiation duration, however, leads to insufficient formation of the PSA layer, leaving the polymerizable monomer in the liquid crystal layer. This causes image sticking. Meanwhile, long ultraviolet light irradiation duration deteriorates organic materials such as the liquid crystal material, generating impurities in the liquid crystal layer. This also causes image sticking.

Image sticking is described in more detail below, with the vertical alignment mode taken as an example. With no voltage applied, liquid crystal molecules are aligned in the direction perpendicular to the substrate surfaces. Short ultraviolet light irradiation duration leads to insufficient formation of the PSA layer, leaving unreacted polymerizable monomers in the liquid crystal layer. When voltage is applied, light from the backlight is applied to the liquid crystal layer in the state where the liquid crystal molecules are aligned parallel to the substrate surfaces, so that the unreacted polymerizable monomers are gradually polymerized. Thus, the liquid crystal molecules are not likely to rotate back in the direction perpendicular to the substrate surfaces even when the voltage application is stopped, whereby image sticking occurs. Such a gradual change in pre-tilt angle of liquid crystal molecules in use of the liquid crystal display device is also referred to as a Δ tilt. Image sticking caused by a Δ tilt is also referred to as tilt image sticking. The Δ tilt and tilt image sticking can occur also in horizontal alignment modes.

Long ultraviolet light irradiation duration may also deteriorate organic materials such as the alignment film and the liquid crystal material, for example, generating radicals. The radicals may generate internal electric fields. The internal electric fields decrease the voltage holding ratio (VHR) and produce residual DC (rDC) voltage, which may change the drive voltage. This causes image sticking. Such image sticking is also referred to as electrical image sticking.

The ultraviolet light irradiation duration may be shortened by, for example, adding a polymerization initiator or a polymerization initiator monomer to the liquid crystal composition to increase the polymerization rate of the polymerizable monomer.

In the case where the PSA technique is applied to a liquid crystal display device in a mode such as the IPS or FFS mode utilizing a photo-alignment technique, a vertical alignment mode, or a 4-domain reverse twisted nematic (4D-RTN) mode, a polymerization initiator cannot be used. Such a liquid crystal display device therefore causes a throughput decrease due to excessively long ultraviolet light irradiation duration and, simultaneously, the voltage holding ratio decreases and the residual DC voltage increases after long-term use of the liquid crystal display device due to the increased ultraviolet light irradiation dose, thereby decreasing the reliability. These undesirable changes are caused by radicals generated from polymerizable monomers remaining slightly in the liquid crystal layer.

To deal with these changes, the present inventors have studied use of a structure having a polymerization initiation function and a monomer having a polymerizable group, i.e., a polymerization initiator with a polymerizable group (hereinafter, also referred to as an initiator monomer). The studies, however, found that as the amount of the initiator monomer introduced into the liquid crystal material increases, the concentration of impurities from the initiator monomer increases, causing image sticking due to the VHR decrease and the residual DC voltage increase. This means that the VHR decreases and the residual DC voltage increases even when an initiator monomer or a polymerization initiator is introduced into a liquid crystal material if they remain in the liquid crystal layer even slightly since they generate radicals in the liquid crystal layer and thus electrical charges are present in the liquid crystal layer.

In the liquid crystal display device disclosed in WO 2011/001579, a side chain that generates radicals when irradiated with ultraviolet light is introduced in the alignment film polymer. This seems to increase the polymerization rate of the monomer, but the effect is small. This is presumably because the mechanism of radical generation is hydrogen abstraction and thus the radical generation efficiency is low.

In the liquid crystal display device disclosed in WO 2014/0038431, a self-cleaving side chain is introduced to the alignment film polymer as a side chain that generates radicals when irradiated with ultraviolet light. This seems to increase the radical generation efficiency as compared with the case of a hydrogen-abstracting side chain.

WO 2014/0038431, however, uses a side chain having a structure represented by the following formula (I) as the self-cleaving side chain. Here, the binding site (—O— group) with the side chain or main chain and the two phenyl groups form a bent shape (become perpendicular to each other), so that the side chain becomes bulky. This may inhibit introduction of another side chain (e.g., vertical alignment functional group, photo-functional group). In such a case, the molecular structure design of the alignment films may be limited.

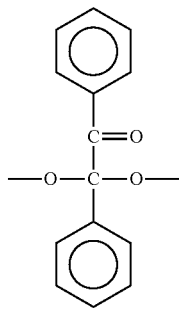

(I)

In response to the above issues, an object of the present invention is to provide a liquid crystal display device with a high degree of freedom in molecular structure design of an alignment film and with reduced image sticking.

(1) One embodiment of the present invention is directed to a liquid crystal display device including: a pair of substrates; a liquid crystal layer between the substrates; an alignment film disposed on a liquid crystal layer side surface of at least one of the substrates; and a polymer layer between the liquid crystal layer and the alignment film, the alignment film containing a first polymer containing at least one structure represented by the following formula (1) in a side chain, the polymer layer containing a second polymer obtained by polymerizing at least one monomer including at least one monomer represented by the following formula (2),

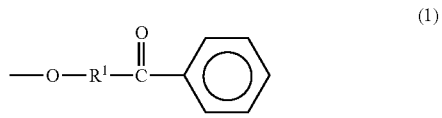

(1)

wherein $R^1$ represents a C3-C6 branched or cyclic alkylene group, and
a hydrogen atom at a para position to a carbonyl group in the phenyl group is optionally replaced,

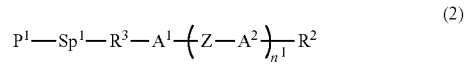

(2)

wherein $R^2$ represents a —$R^3$-$Sp^1$-$P^1$ group, a hydrogen atom, a halogen atom, a —CN group, a —NO$_2$ group, a —NCO group, a —NCS group, a —OCN group, a —SCN group, a —SF$_5$ group, or a C1-C18 linear or branched alkyl group;
$P^1$ represents a radically polymerizable group;
$Sp^1$ represents a C1-C6 linear, branched, or cyclic alkylene or alkyleneoxy group, or a direct bond;
a hydrogen atom in $R^2$ is optionally replaced by a fluorine atom or a chlorine atom;
a —CH$_2$— group in $R^2$ is optionally replaced by a —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH═CH— group, a —CF═CF— group, a —C≡C— group, a —CH═CH—COO— group, or a —OCO—CH═CH— group, unless otherwise an oxygen atom and a sulfur atom are adjacent to each other;
$R^3$ represents a —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH═CH— group, a —CF═CF— group, a —C≡C— group, a —CH═CH—COO— group, a —OCO—CH═CH— group, or a direct bond;
$A^1$ and $A^2$ are the same as or different from each other and each represent a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2,2,2]octylene group, a piperidine-1,4-diyl group, a decahydronaphthalene-2,6-diyl group, a 1,2,3,4-tetrahydronaphthalene-2,6-diyl group, an indane-1,3-diyl group, an indane-1,5-diyl group, an indane-2,5-diyl group, a phenanthrene-1,6-diyl group, a phenanthrene-1,8-diyl group, a phenanthrene-2,7-diyl group, or a phenanthrene-3,6-diyl group;

a —CH$_2$— group in each of A$^1$ and A$^2$ is optionally replaced by a —O— group or a —S— group, unless otherwise an oxygen atom and a sulfur atom are adjacent to each other;

a hydrogen atom in each of A$^1$ and A$^2$ is optionally replaced by a fluorine atom, a chlorine atom, a —CN group, or a C1-C6 alkyl, alkoxy, alkylcarbonyl, alkoxycarbonyl, or alkylcarbonyloxy group;

Z represents a —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, a —OCO—CH=CH— group, or a direct bond; and n$^1$ is 0, 1, or 2.

(2) In an embodiment of the present invention, the liquid crystal display device includes the structure (1), and the first polymer contains at least one structure represented by any of the following formulas (1-1) to (1-6) in a side chain,

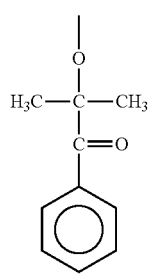
(1-1)

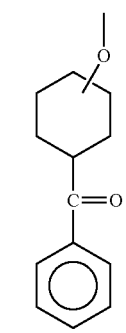
(1-2)

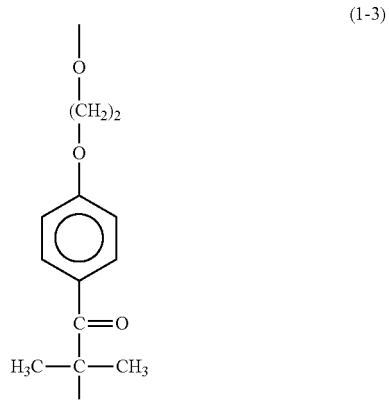
(1-3)

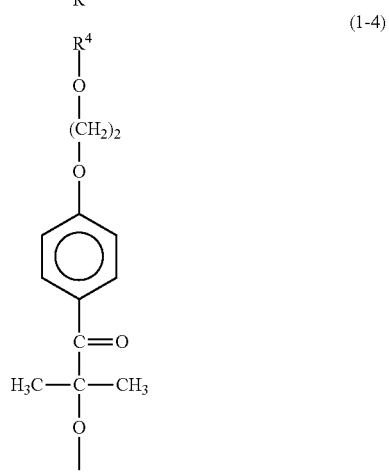
(1-4)

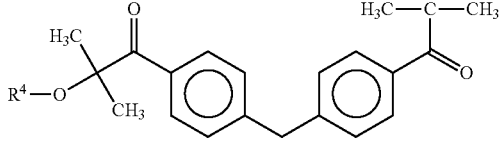
(1-5)

(1-6)

wherein R$^4$s are the same as or different from each other and each represent a C1-C40 saturated or unsaturated hydrocarbon group.

(3) In an embodiment of the present invention, the liquid crystal display device includes the structure (2), and the first polymer contains the structure represented by the above formula (1-1) in a side chain.

(4) In an embodiment of the present invention, the liquid crystal display device includes the structure (3), and the first polymer contains at least one structure represented by the following formula (3) in a side chain,

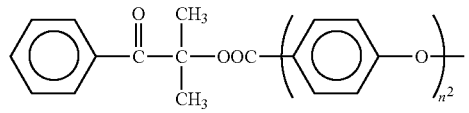
(3)

wherein n² is an integer of 1 to 3.

(5) In an embodiment of the present invention, the liquid crystal display device includes the structure (3) or (4), and the first polymer contains at least one structure represented by any of the following formulas (4-1) and (4-2) in a side chain,

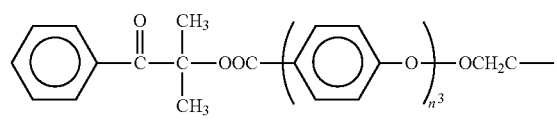
(4-1)

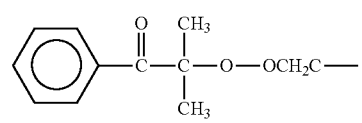
(4-2)

wherein $n^3$ is an integer of 1 to 3.

(6) In an embodiment of the present invention, the liquid crystal display device includes the structure (1), (2), (3), (4), or (5), and the first polymer contains at least one of a polyamic acid structure or a polyimide structure in a main chain.

(7) In an embodiment of the present invention, the liquid crystal display device includes the structure (6), and the first polymer contains at least one structure represented by any of the following formulas (5) and (6), wherein X represents the group represented by the above formula (5-1);

Y represents the group represented by the above formula (5-2) or (5-3);

$p^1$ represents a degree of polymerization, and $p^1$, $q^1$, and $r^1$ are each independently an integer of 1 or greater, and $q^1$ and $r^1$ satisfy $0 < r^1/(q^1+r^1) \le 1$;

$R^5$ is a photo-functional group, a vertical alignment functional group, a horizontal alignment functional group, or a combination thereof; and $R^6$ represents a group represented by the following formula (5-4) or (5-5),

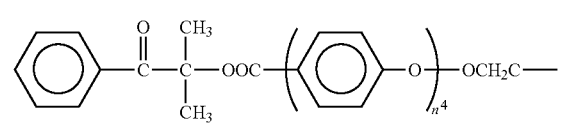
(5-4)

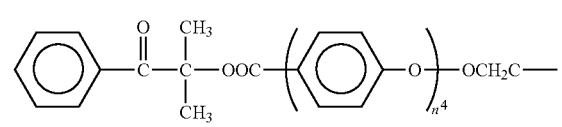
(5-5)

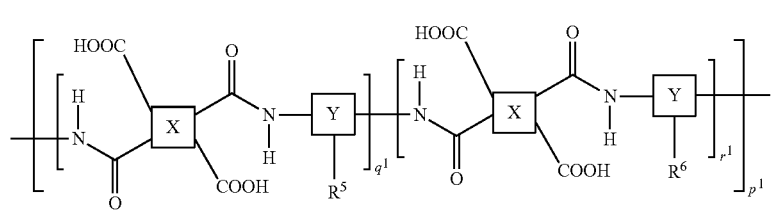
(5)

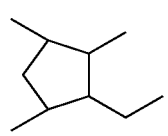
(5-1)

(5-2)

(5-3)

wherein $n^4$ is an integer of 1 to 3,

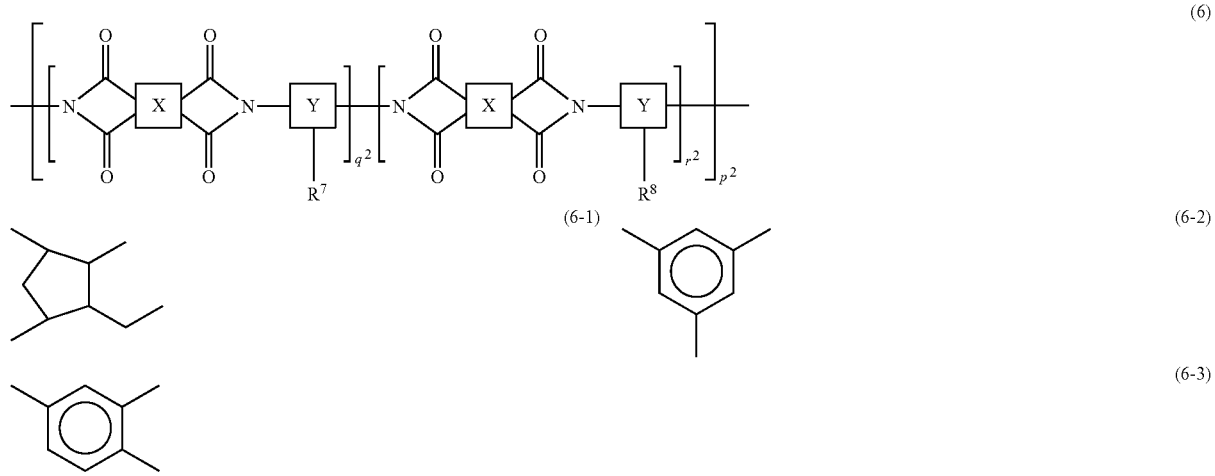

(6)

(6-1)

(6-2)

(6-3)

wherein X represents the group represented by the above formula (6-1);

Y represents the group represented by the above formula (6-2) or (6-3);

$p^2$ represents a degree of polymerization, $p^2$, $q^2$, and $r^2$ are each independently an integer of 1 or greater, and $q^2$ and $r^2$ satisfy $0 < r^2/(q^2+r^2) \leq 1$;

$R^7$ is a photo-functional group, a vertical alignment functional group, a horizontal alignment functional group, or a combination thereof; and $R^8$ represents a group represented by the following formula (6-4) or (6-5),

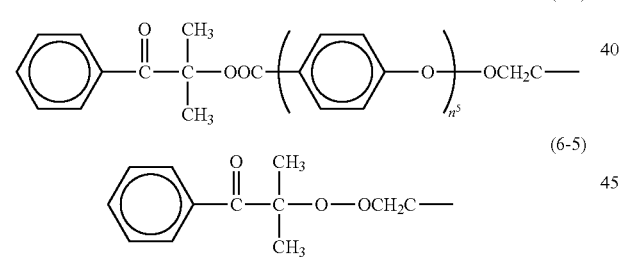

(6-4)

(6-5)

wherein $n^5$ is an integer of 1 to 3.

(8) In an embodiment of the present invention, the liquid crystal display device includes the structure (1), (2), (3), (4), (5), (6), or (7), and the first polymer contains at least one photo-functional group.

(9) In an embodiment of the present invention, the liquid crystal display device includes the structure (8), and the first polymer contains at least one photo-functional group selected from the group consisting of a cinnamate group, an azobenzene group, a chalcone group, and a coumarin group, each of which optionally contains a substituent.

(10) In an embodiment of the present invention, the liquid crystal display device includes the structure (1), (2), (3), (4), (5), (6), (7), (8), or (9), and the second polymer is a polymer obtained by radically polymerizing the at least one monomer.

(11) In an embodiment of the present invention, the liquid crystal display device includes the structure (1), (2), (3), (4), (5), (6), (7), (8), (9), or (10), and the at least one monomer represented by the above formula (2) includes at least one monomer represented by any of the following formulas (7-1) to (7-5),

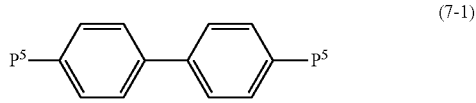

(7-1)

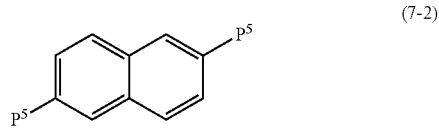

(7-2)

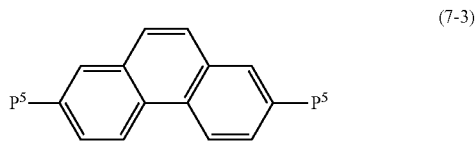

(7-3)

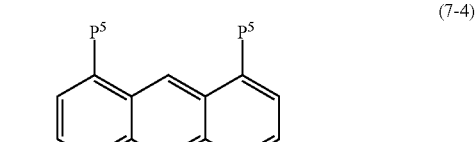

(7-4)

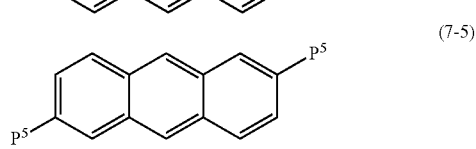

(7-5)

wherein $P^5$ represents a radically polymerizable group.

(12) In an embodiment of the present invention, the liquid crystal display device includes the structure (1), (2), (3), (4), (5), (6), (7), (8), (9), (10), or (11), and the liquid crystal display device is in a liquid crystal driving mode of an MVA mode, a 4D-RTN mode, an FFS mode, or an IPS mode.

The present invention can provide a liquid crystal display device with a high degree of freedom in molecular structure design of an alignment film and with reduced image sticking.

DETAILED DESCRIPTION OF THE INVENTION

Figure 1A:
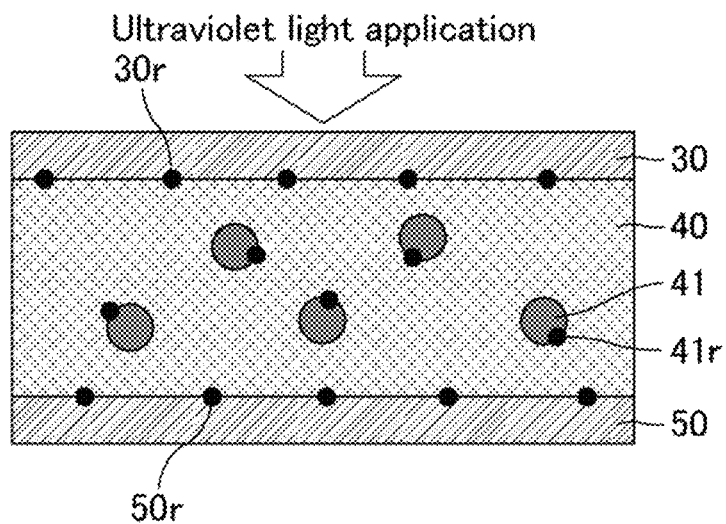
FIG. 1A is a schematic cross-sectional view of a liquid crystal cell before polymerization of monomers, illustrating a polymer layer formation process in a method for producing a liquid crystal display device of Embodiment 1.

The present invention is described in more detail below based on the following embodiment with reference to the drawings. The embodiment, however, is not intended to limit the scope of the present invention. The configurations of the embodiment may appropriately be combined or modified within the spirit of the present invention.

The "viewing surface side" as used herein means the side closer to the screen (display surface) of the display device. The "back surface side" means the side farther from the screen (display surface) of the display device. The "room temperature" is 15° C. or higher and 40° C. or lower, unless otherwise specified.

The "photo-functional group" as used herein means a functional group that can undergo a photoreaction. The photo-functional group preferably can undergo a structural change such as dimerization (formation of dimers), isomerization, photo-Fries rearrangement, and decomposition (cleavage) when irradiated with light (electromagnetic waves) such as ultraviolet rays or visible light (preferably polarized light, more preferably polarized ultraviolet rays, particularly preferably linearly polarized ultraviolet rays), and thereby exhibit an ability of controlling the alignment of liquid crystal compounds. Specific examples of the photo-functional group include an azobenzene group, a chalcone group, a cinnamate group, a coumarin group, a tolane group, a stilbene group, and a cyclobutane ring.

The nematic-isotropic phase transition temperature (Tni) as used herein is determined by visually observing the liquid crystal state or the isotropic state while varying the temperature using a device such as one from Mettler. The temperature can also be determined by a technique of determining the temperature at which phase transition occurs using a differential scanning calorimeter (DSC).

The mode herein in which liquid crystal compounds (molecules) are aligned in a direction substantially parallel to a main surface of each of the pair of substrates with no voltage applied to the liquid crystal layer is also referred to as a horizontal alignment mode. The expression "substantially parallel" means that, for example, the pre-tilt angle of liquid crystal compounds is 0° or greater and 5° or smaller from the main surface of each substrate. The mode in which liquid crystal compounds are aligned in a direction substantially perpendicular to the main surface of each of the pair of substrates with no voltage applied to the liquid crystal layer is also referred to as a vertical alignment mode. The expression "substantially perpendicular" means that, for example, the pre-tilt angle of liquid crystal compounds is 85° or greater and 90° or smaller from the main surface of the substrate. The pre-tilt angle is an angle of the major axis of a liquid crystal material (liquid crystal compound) from a surface of a substrate when the voltage applied to the liquid crystal layer is lower than the threshold voltage (including the case of no voltage application), with the substrate surface taken as 0° and the line normal to the substrate as 90°. The present invention is applicable to both horizontal alignment mode liquid crystal display devices and vertical alignment mode liquid crystal display devices.

Embodiment 1

The present embodiment is summarized first. The present embodiment takes the following measures (1) and (2) to overcome the above issues.

(1) A side chain of a polymer constituting an alignment film is chemically modified with (covalently bonded to) a functional group capable of initiating radical polymerization under light (hereinafter, also referred to as an initiator functional group).

In this measure, a polymerization initiator or an initiator monomer is not introduced into the liquid crystal layer, and the moiety functioning as a polymerization initiator can be immobilized on an alignment film surface. This prevents the polymerization initiator components from remaining in the liquid crystal layer, reducing generation of image sticking due to polymerization initiator components. Also, just adding a low molecular weight polymerization initiator into an alignment film may not be enough to prevent the polymerization initiator, which has a low molecular weight, from dissolving in the liquid crystal layer. The point is to introduce the initiator functional group into a side chain of the polymer constituting the alignment film and covalently bond the polymer to the polymer layer.

(2) A side chain having at least one structure represented by the following formula (1) is used as the side chain containing an initiator functional group. This structure is a self-cleaving initiator functional group, and can increase the radical generation efficiency as compared with a hydrogen-abstracting initiator functional group. Also in this structure, the binding site (—O— group) with the main chain and the phenyl group are positioned linearly, so that the side chain containing such a structure does not become bulky. This measure therefore reduces the need to consider the influence on introduction and the introduction ratio of another side chain (e.g., vertical alignment functional group, photo-functional group). Thus, the degree of freedom in the molecular structure design of the alignment film is high.

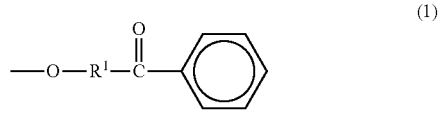
(1)

In the formula, $R^1$ represents a C3-C6 branched or cyclic alkylene group, and a hydrogen atom at a para position to a carbonyl group in the phenyl group is optionally replaced.

Figure 1B:
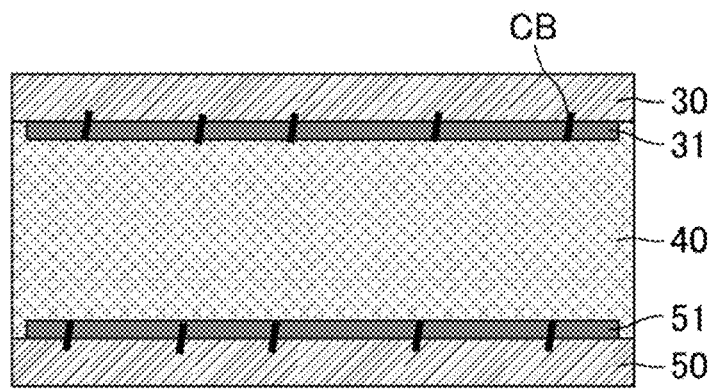
FIG. 1B is a schematic cross-sectional view of the liquid crystal cell after the polymerization of monomers, illustrating the polymer layer formation process in the method for producing the liquid crystal display device of Embodiment 1.

FIG. 1A is a schematic cross-sectional view of a liquid crystal cell before polymerization of monomers, illustrating a polymer layer formation process in a method for producing a liquid crystal display device of Embodiment 1. FIG. 1B is a schematic cross-sectional view of the liquid crystal cell after the polymerization of monomers, illustrating the polymer layer formation process in the method for producing the liquid crystal display device of Embodiment 1. As shown in FIG. 1A, application of ultraviolet light not only generates radicals 41r in monomers 41 but also generates radicals 30r and 50r in polymer side chains of alignment films 30 and 50, respectively. As shown in FIG. 1B, the monomers 41 in the liquid crystal layer 40 are covalently bonded to the polymer side chains of the alignment films 30 and 50. This enables the design of a PSA liquid crystal display device in which the alignment films 30 and 50 are bonded to the polymer layers 31 and 51 by covalent bonds CB, respectively. The covalent bonds between the alignment film 30 and the corresponding polymer layer 31 and between the alignment film 50 and the corresponding polymer layer 51 increase the polymerization rate of the monomers 41 to increase the formation rates of the polymer layers 31 and 51. In the present embodiment, as described above, a side chain having a non-bulky structure can be used as the side chain containing an initiator functional group, so that the steric hindrance between the side chain molecules of the polymer constituting the alignment films 30 and 50 can be reduced and the polymerization rate of the monomers 41 can be further increased. Thereby, unreacted monomers 41 remaining in the liquid crystal layer 40 can be reduced and the VHR, rDC, and Δ tilt in long-term use are improved.

Figure 2:
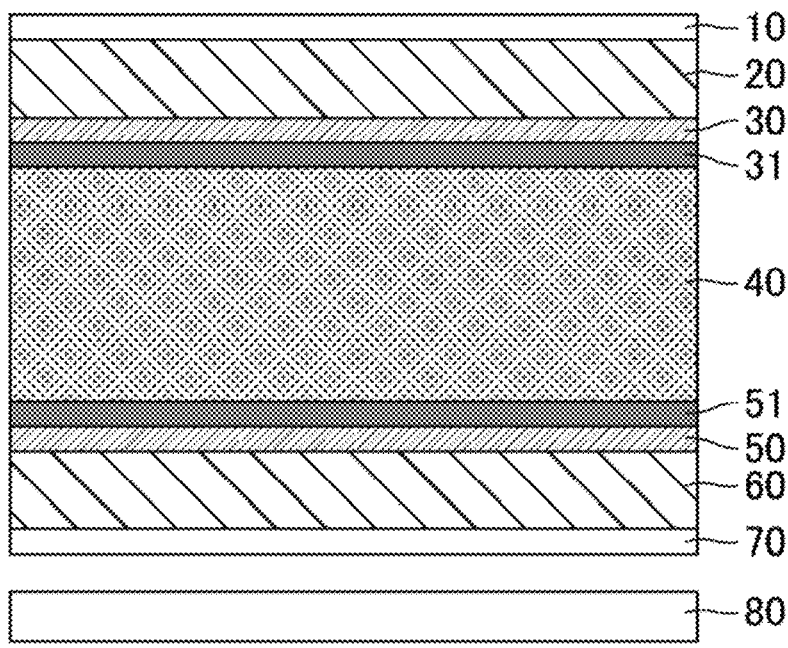
FIG. 2 is a schematic cross-sectional view of the liquid crystal display device of Embodiment 1.

FIG. 2 is a schematic cross-sectional view of the liquid crystal display device of Embodiment 1. As shown in FIG. 2, the liquid crystal display device of Embodiment 1 is a horizontal alignment mode or vertical alignment mode liquid crystal display device including, in the following order from the viewing surface side to the back surface side, a first linear polarizer 10, a counter substrate 20, an alignment film 30, a polymer layer (PSA layer) 31, a liquid crystal layer 40, a polymer layer (PSA layer) 51, an alignment film 50, a thin-film transistor (TFT) substrate 60, a second linear polarizer 70, and a backlight 80.

The first linear polarizer 10 can be, for example, a polarizer (absorptive polarizer) obtained by dyeing a polyvinyl alcohol (PVA) film with an anisotropic material such as an iodine complex (or dye) to adsorb the anisotropic material on the polyvinyl alcohol film, and stretching the film for alignment. Typically, each surface of a PVA film is laminated with a protective film such as a triacetyl cellulose (TAC) film in practical use for sufficient mechanical strength and sufficient moisture and heat resistance.

The counter substrate 20 is a color filter (CF) substrate that includes, in the following order from the viewing surface side to the back surface side, a transparent substrate (not illustrated), color filters/black matrix (not illustrated), and a flattening film as necessary.

The transparent substrate may be, for example, a glass substrates or a plastic substrate.

The color filters/black matrix have a structure in which red color filters, green color filters, and blue color filters are arranged in a plane and partitioned by a black matrix. The red color filters, the green color filters, the blue color filters, and the black matrix are each made of, for example, a transparent resin containing a pigment. Typically, a combination of a red color filter, a green color filter, and a blue color filter is arranged in each pixel, and the desired color is achieved in each pixel by mixing colors of the red color filter, the green color filter, and the blue color filter while controlling the amount of light passing through the filters.

The alignment films 30 and 50 may be horizontal alignment films configured to align liquid crystal compounds in a direction substantially parallel to their surfaces or may be vertical alignment films configured to align liquid crystal compounds in a direction substantially perpendicular to their surfaces. The alignment films 30 and 50 may be photoalignment films containing a photo-functional group and having been subjected to photo-alignment as the alignment treatment, rubbed alignment films having been subjected to rubbing as the alignment treatment, or alignment films not having been subjected to any alignment treatment.

Each of the alignment films 30 and 50 contains a first polymer having at least one structure represented by the above formula (1) in a side chain.

The structure represented by the above formula (1) is an initiator functional group and thus can generate radicals when irradiated with ultraviolet light, thereby being functionable as a photo-radical polymerization initiator. Meanwhile, this structure, contained in the first polymer, hardly dissolves in the liquid crystal layer 40, unlike common polymerization initiators and initiator monomers to be added to the liquid crystal layer in the PSA technique. Also, radicals generated from this structure react with monomers added to the liquid crystal layer 40, and the alignment films 30 and 50 form covalent bonds with polymers (the later-described second polymer) constituting the polymer layers 31 and 51, respectively. This can increase the formation rates of the polymer layers 31 and 51 (polymerization rates of the monomers). Also, since the non-bulky side chain containing the structure leads to reduction of steric hindrance between the side chain molecules of the first polymer, the formation rates (polymerization rates of the monomers) of the polymer layers 31 and 51 can be further increased. Thereby, unreacted monomers remaining in the liquid crystal layer 40 can be reduced while the ultraviolet light irradiation dose for the liquid crystal layer 40 in the polymer layer formation process can be reduced. Consequently, a change in tilt of liquid crystal molecules, a VHR decrease, and a residual DC voltage increase can be prevented even after long-term use of the liquid crystal display device of the present embodiment.

Figure 3:
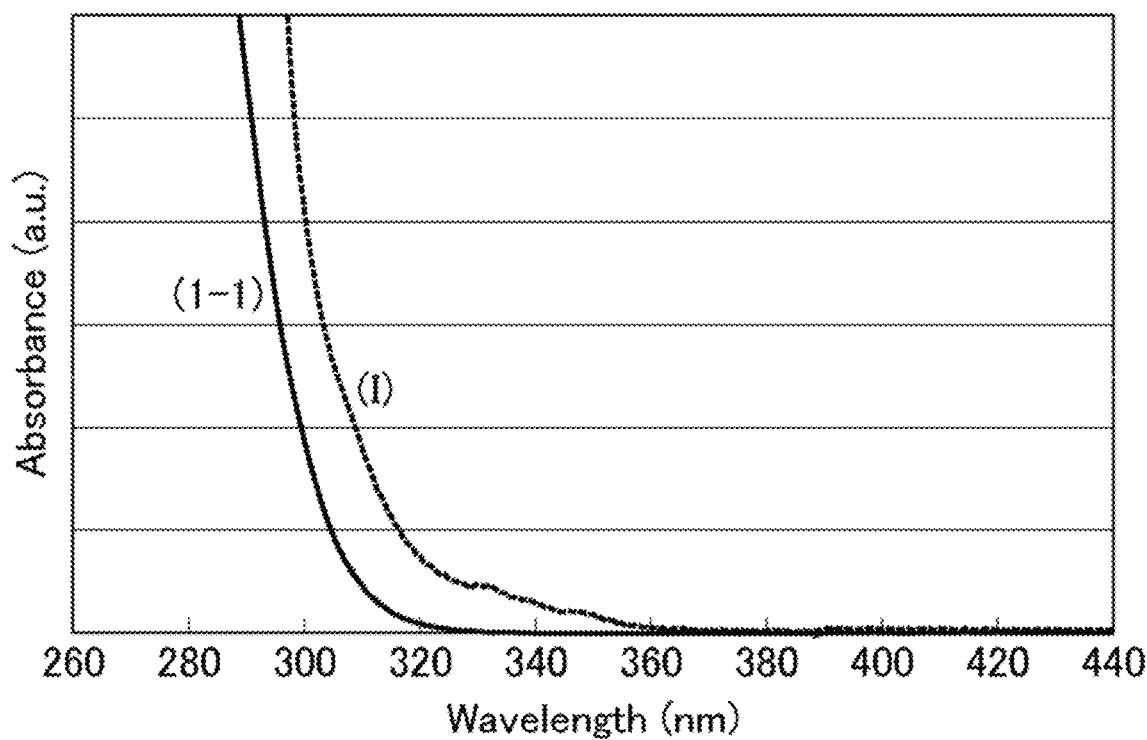
FIG. 3 is a graph of absorption spectra of a structure represented by the above formula (I) and a structure represented by the below formula (1-1), which is one of the structures represented by the above formula (1).

The liquid crystal display device disclosed in WO 2014/0038431 uses a self-cleaving side chain having the structure represented by the above formula (I). This structure absorbs ultraviolet light having a comparatively long wavelength. FIG. 3 is a graph of absorption spectra of a structure represented by the above formula (I) and a structure represented by the below formula (1-1), which is one of the structures represented by the above formula (1). As shown in FIG. 3, the structure represented by the above formula (I) has a shorter absorption wavelength than the structure represented by the following formula (1-1). For this reason, when an unreacted structure remains and the liquid crystal display device is used for a long period of time, i.e., several years, the unreacted structure is likely to cleave under the backlight illumination or external light, generating radicals. In the case of a photocleavage under the backlight illumination, radical generation is likely to start from the alignment film closer to the backlight. In the case of a photocleavage under external light, radical generation is likely to start from the alignment film closer to the external light (i.e., the side remote from the backlight). Such photocleavages are presumed to cause a gradual increase in residual DC voltage.

Meanwhile, the structure represented by the formula (1) is not likely to cause asymmetrization due to the above radical generation even when the liquid crystal display device of the present embodiment is used for a very long period of time because the structure represented by the above formula (1) has a shorter absorption wavelength than the structure represented by the above formula (I). Hence, the structure represented by the above formula (1) is preferred to the structure represented by the above formula (I) even when the liquid crystal display device is used for a very long period of time and the backlight has a high luminance.

The first polymer preferably contains at least one structure represented by any of the following formulas (1-1) to (1-6) in a side chain. These may be used alone or in combination with each other. In particular, the first polymer more preferably contains a structure represented by the following formula (1-1), still more preferably at least one structure represented by the following formula (3). These may be used alone or in combination with each other.

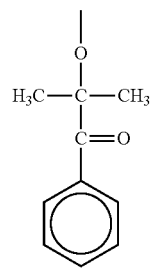
(1-1)

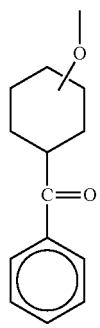
(1-2)

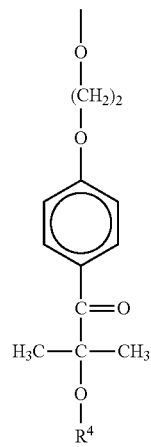
(1-3)

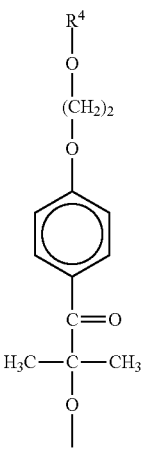
(1-4)

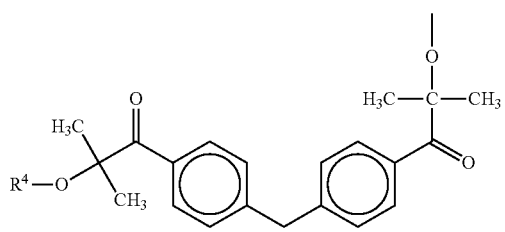
(1-5)

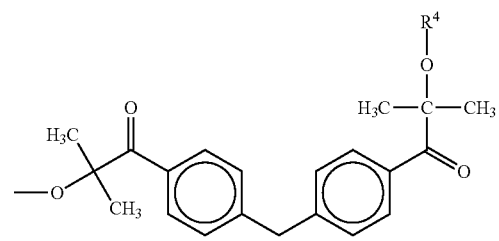
(1-6)

In the formulas, $R^4$s are the same as or different from each other and each represent a C1-C40 saturated or unsaturated hydrocarbon group.

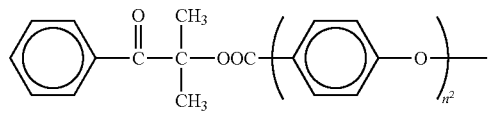
(3)

In the formula, $n^2$ is an integer of 1 to 3, preferably 1.

The first polymer particularly preferably contains at least one structure represented by any of the following formulas (4-1) and (4-2). These may be used alone or in combination with each other.

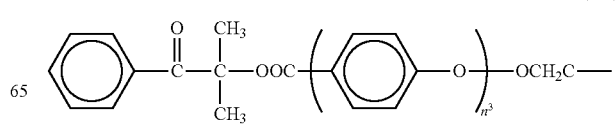
(4-1)

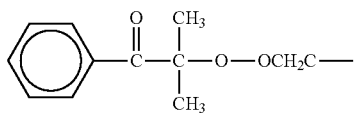
(4-2)

In the formula, $n^3$ is an integer of 1 to 3, preferably 1.

The first polymer preferably contains at least one of a polyamic acid structure or a polyimide structure in the main chain. In this case, the first polymer contains a diamine-derived structure and a tetracarboxylic dianhydride-derived structure as repeating structures, and is obtained by polymerizing at least two diamines and at least one tetracarboxylic dianhydride. The diamines used are a diamine containing an alignment functional group such as a photo-functional group, a vertical alignment functional group, or a horizontal alignment functional group, and a diamine containing the above initiator functional group.

Examples of the diamine containing a photo-functional group include those represented by any of the following formulas (8-1) to (8-24). The group represented by any of the following formulas (8-1) to (8-24) is a vertical alignment photo-functional group, and can be used when the alignment films 30 and 50 are vertical alignment films. These may be used alone or in combination with each other.

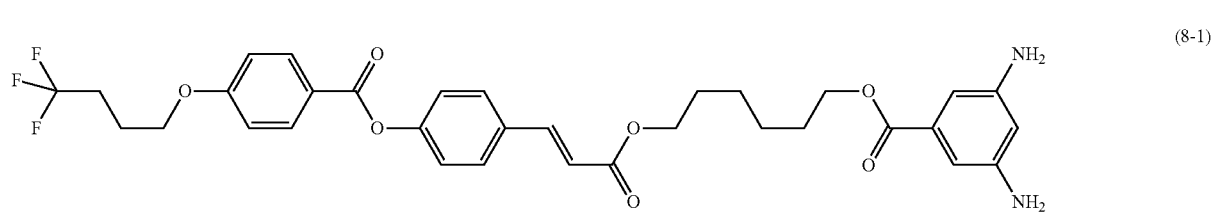
(8-1)

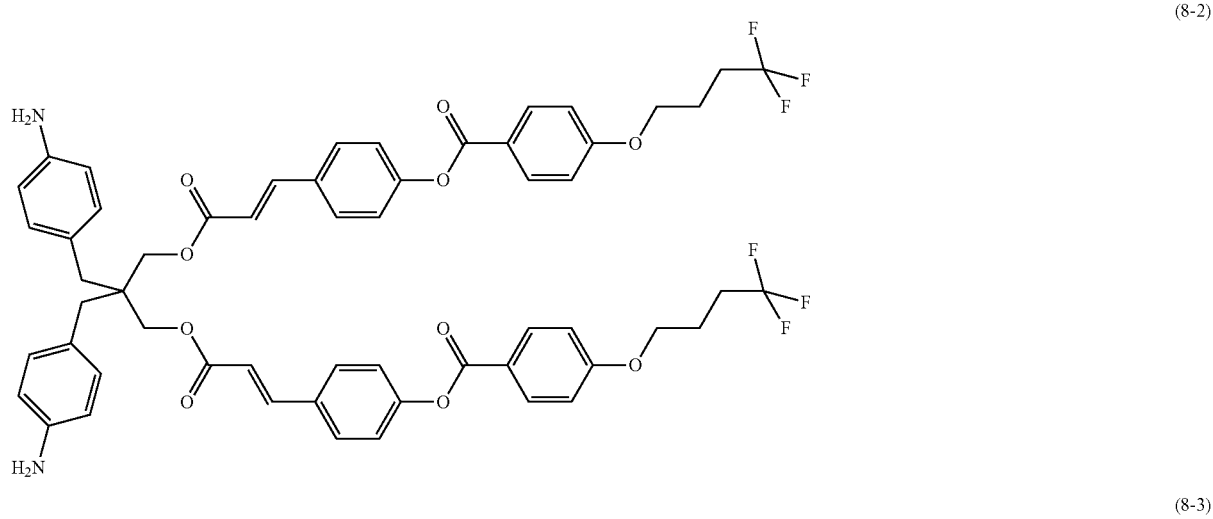
(8-2)

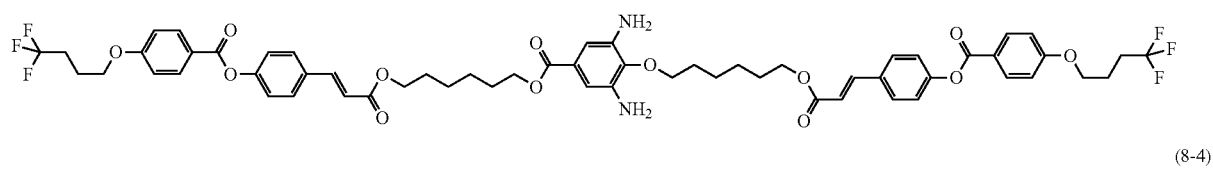
(8-3)

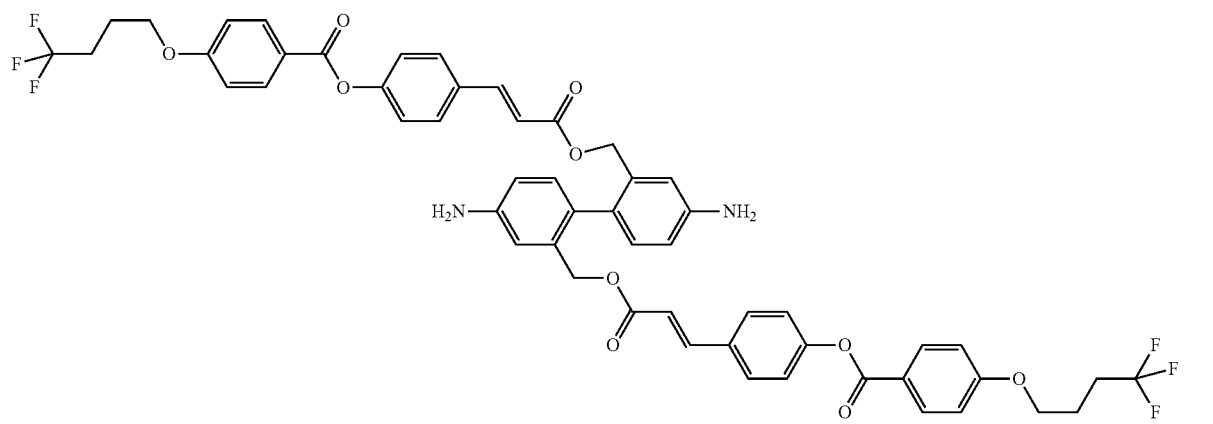
(8-4)

(8-5)
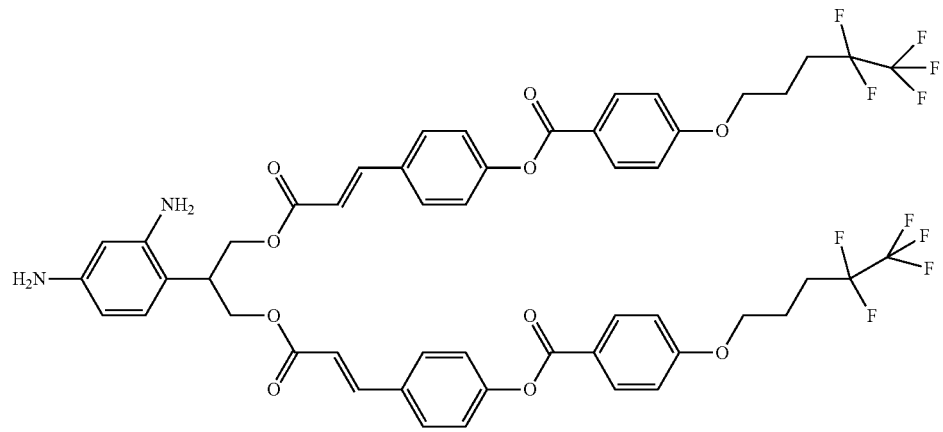
(8-6)
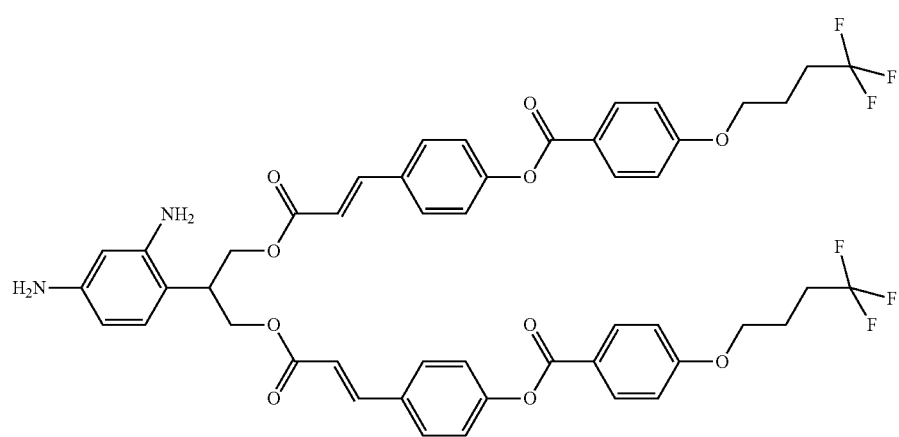
(8-7)
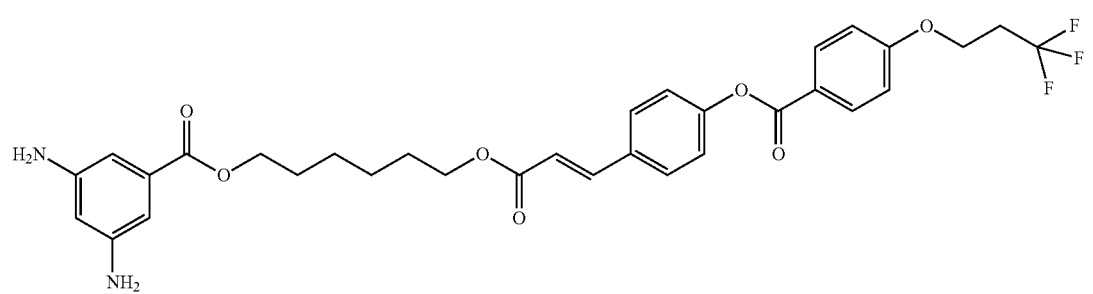
(8-8)
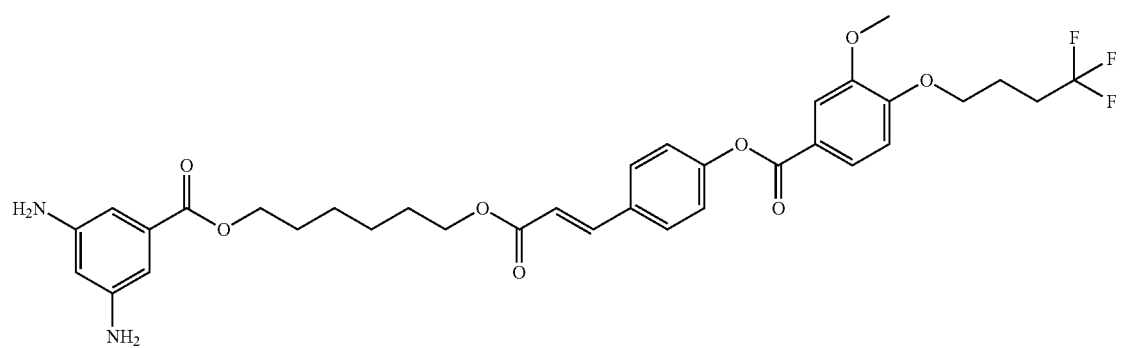

-continued
(8-9)
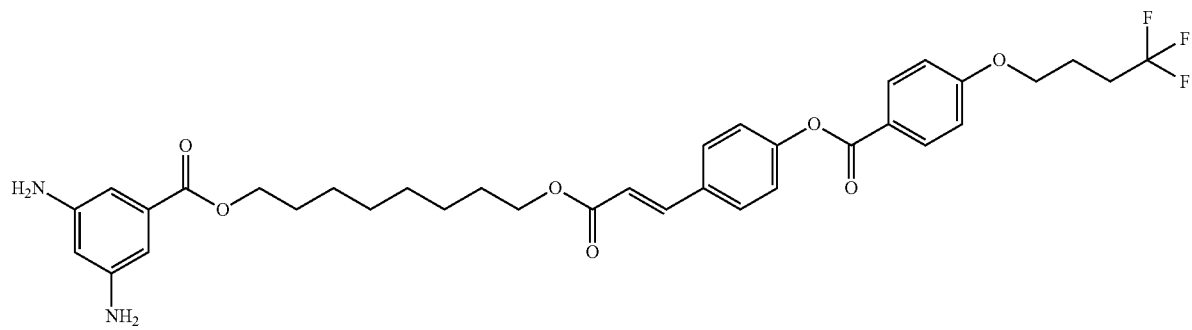
(8-10)
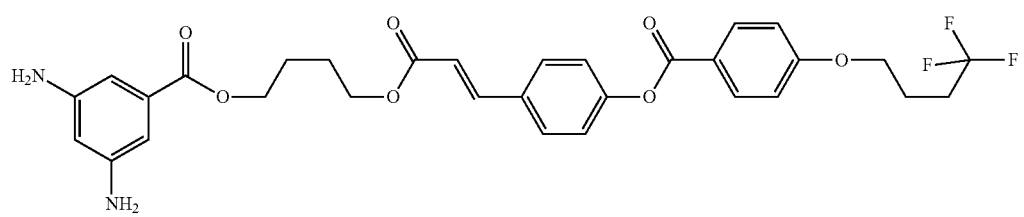
(8-11)
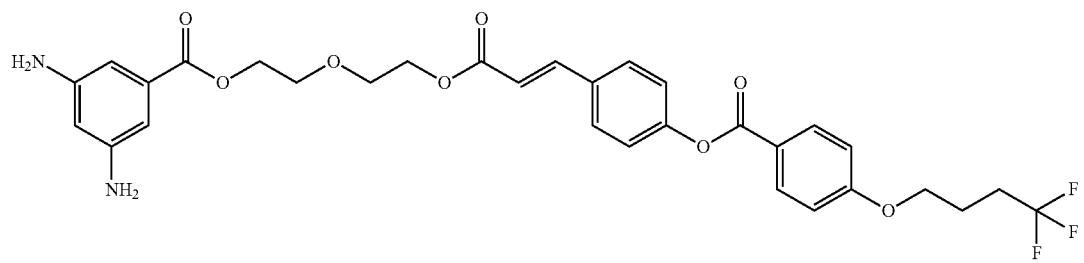
(8-12)
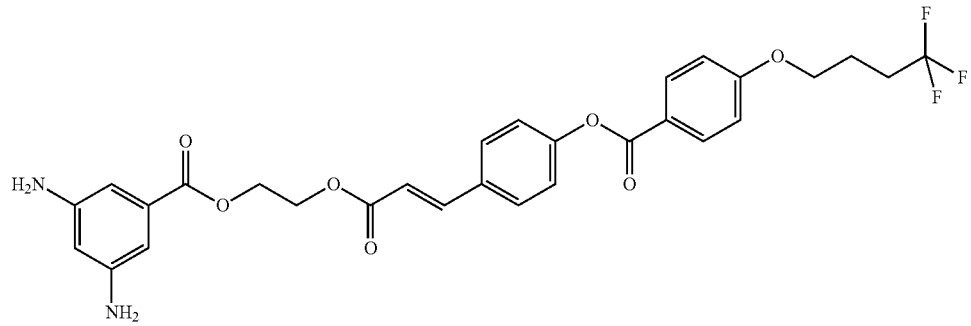
(8-13)
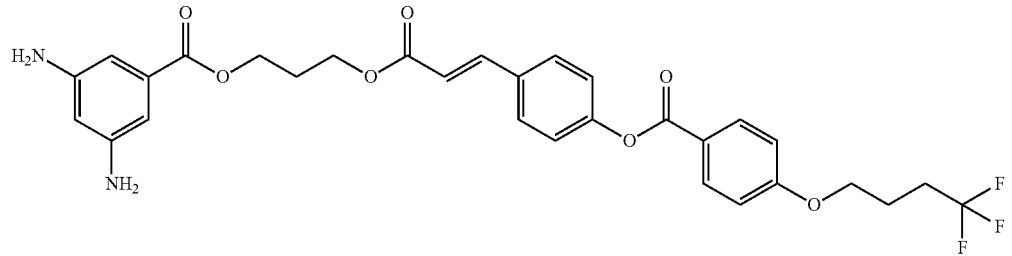

-continued
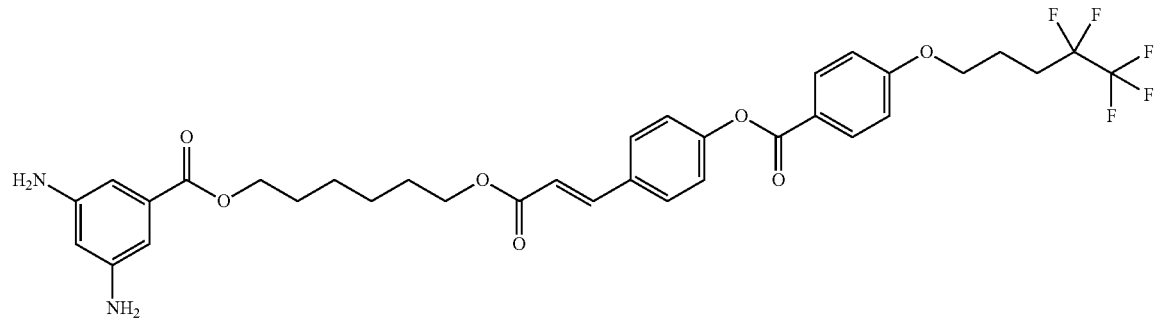
(8-14)
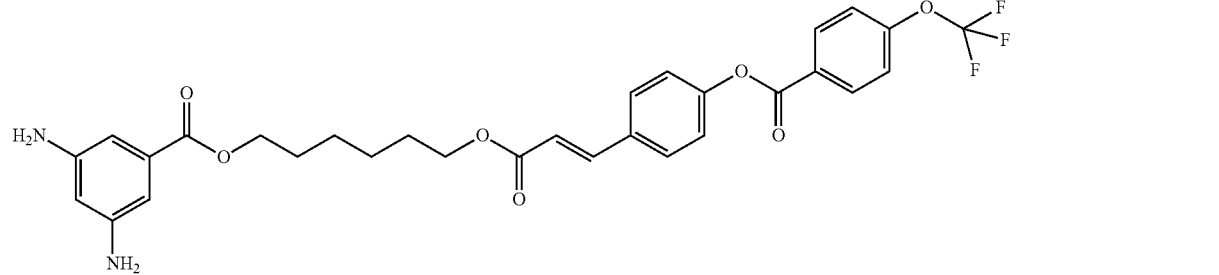
(8-15)
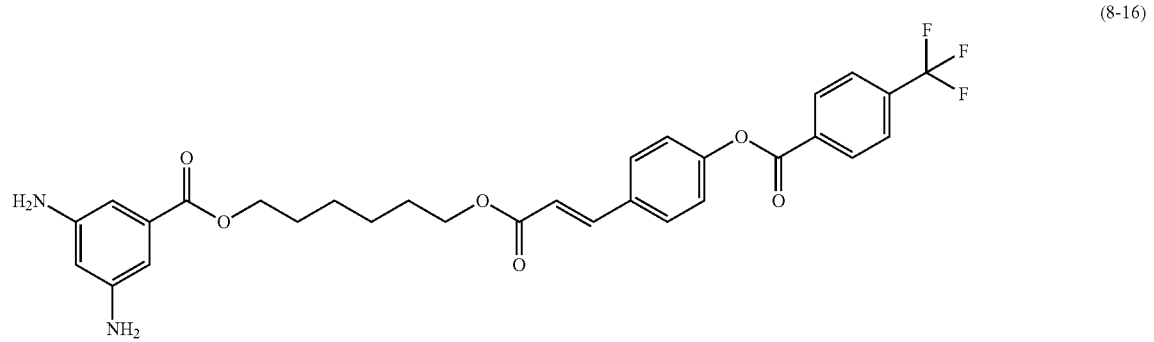
(8-16)
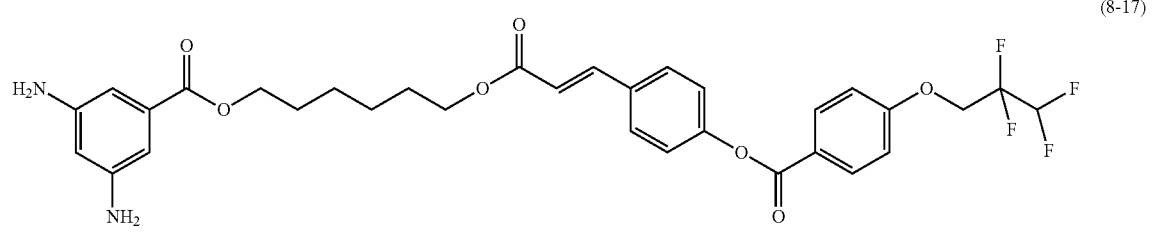
(8-17)
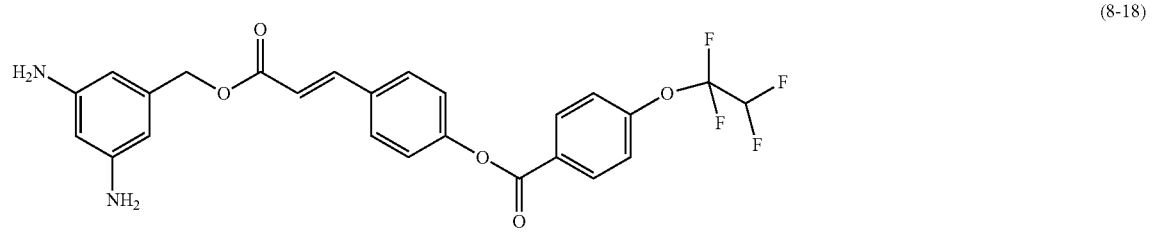
(8-18)
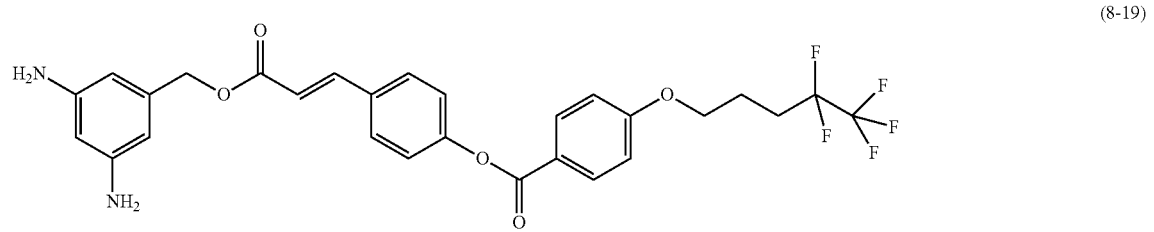
(8-19)

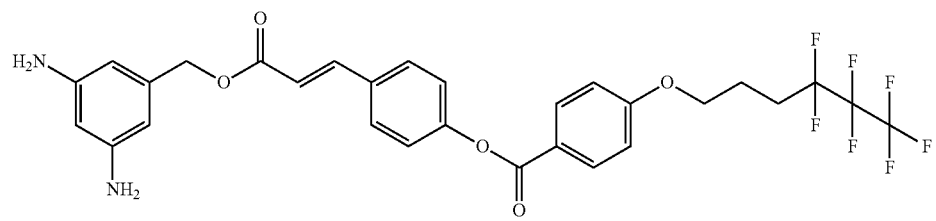

(8-20)

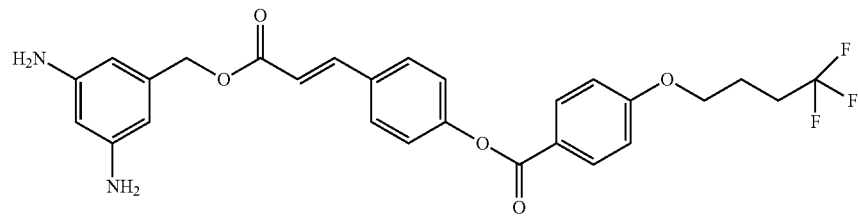

(8-21)

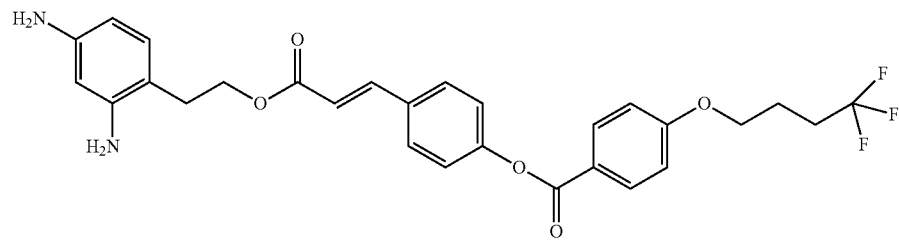

(8-22)

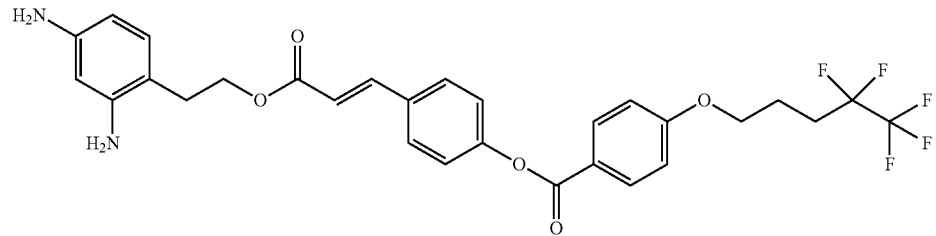

(8-23)

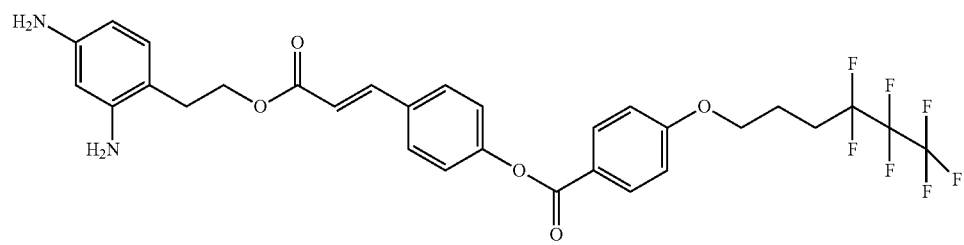

(8-24)

The examples of the diamine containing a photo-functional group also include those represented by any of the following formulas (9-1) and (9-2). The group represented by any of the following formulas (9-1) and (9-2) is a horizontal alignment photo-functional group, and can be used when the alignment films 30 and 50 are horizontal alignment films. These may be used alone or in combination with each other.

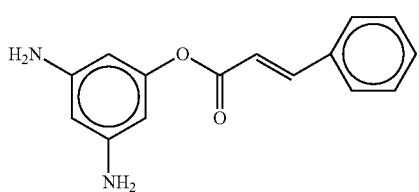

(9-1)

(9-2)

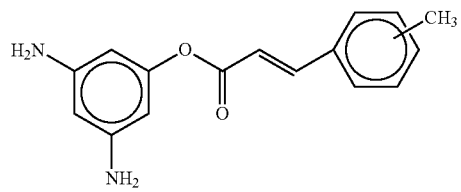

Examples of the diamine containing a vertical alignment functional group other than the photo-functional group include those represented by any of the following formulas (10-1) to (10-7). The group represented by any of the following formulas (10-1) to (10-7) can be used when the alignment films 30 and 50 are vertical alignment films. These may be used alone or in combination with each other.

(10-1)

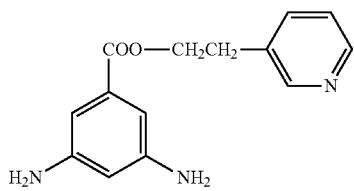

(10-2)

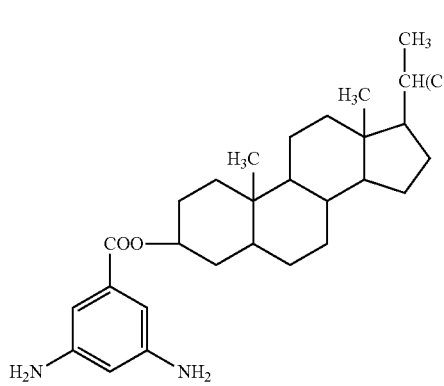

(10-3)

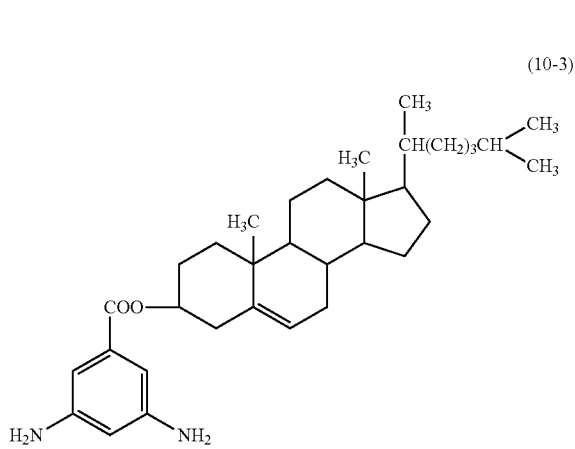

(10-4)

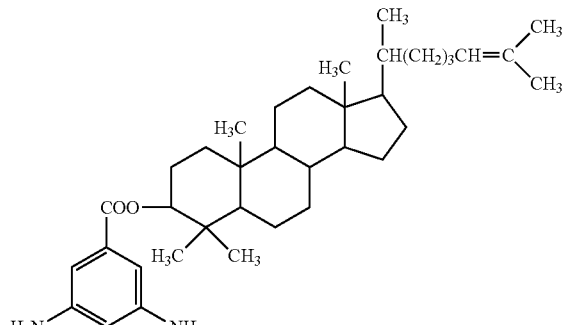

(10-5)

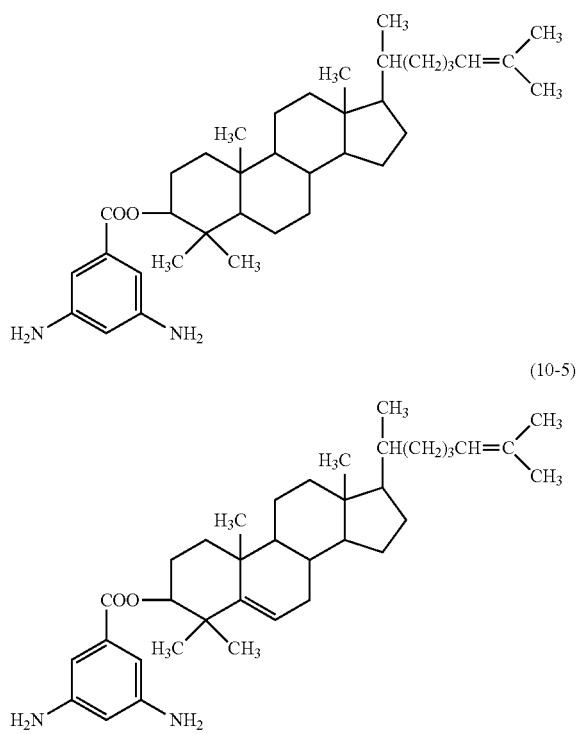

(10-6)

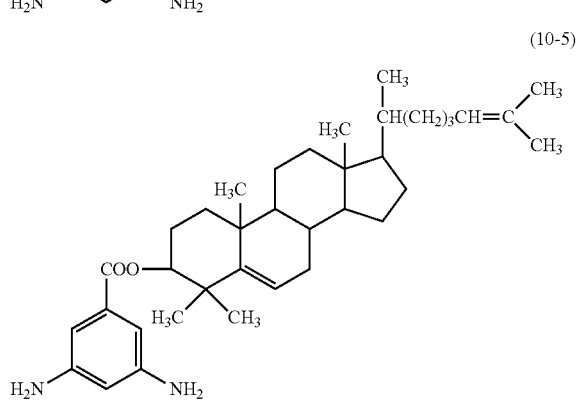

(10-7)

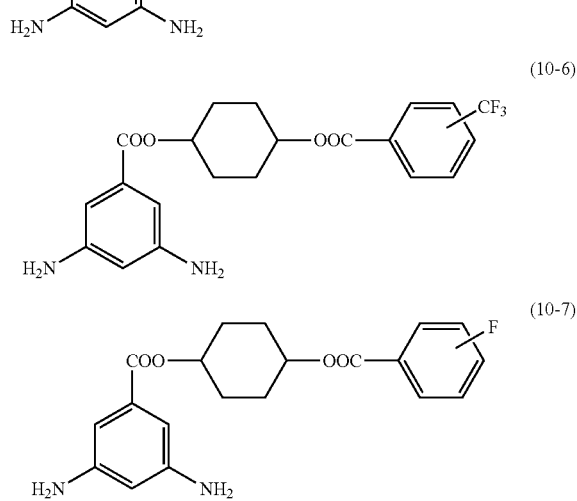

Examples of the diamine containing a horizontal alignment functional group other than the photo-functional group include those represented by any of the following formulas (11-1) to (11-8). The group represented by any of the following formulas (11-1) to (11-8) can be used when the alignment films 30 and 50 are horizontal alignment films. These may be used alone or in combination with each other.

(11-1)

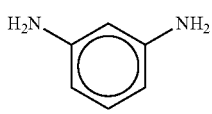

(11-2) through (11-8): various diaminobenzene structures with substituents (CH₃, C₂H₅, CF₃, phenyl, cyclohexyl, methylphenyl, methylcyclohexyl).

$$(12)$$

$$(12\text{-}1)$$

$$(12\text{-}2)$$

$$(12\text{-}3)$$

In the formula, X represents a group represented by the above formula (12-1);

Y represents a group represented by the above formula (12-2) or (12-3);

$p^3$ represents a degree of polymerization, and $p^3$, $q^3$, and $r^3$ are each independently an integer of 1 or greater, and $q^3$ and $r^3$ satisfy $0 < r^3/(q^3+r^3) \leq 1$;

$R^9$ is a photo-functional group, a vertical alignment functional group, a horizontal alignment functional group, or a combination thereof; and $Sp^2$ represents a spacer or a direct bond.

$$(13)$$

$$(13\text{-}1)$$

Examples of the first polymer containing at least one of a polyamic acid structure or a polyimide structure in the main chain (hereinafter, such a polymer is also referred to as a polyimide-based first polymer) include those containing at least one structure represented by any of the following formulas (12) and (13). These may be used alone or in combination with each other.

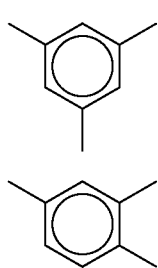
(13-2)

(13-3)

In the formula, X represents a group represented by the above formula (13-1);

Y represents a group represented by the above formula (13-2) or (13-3);

$p^4$ represents a degree of polymerization, and $p^4$, $q^4$, and $r^4$ are each independently an integer of 1 or greater, and $q^4$ and $r^4$ satisfy $0<r^4/(q^4+r^4)\leq 1$;

$R^{10}$ is a photo-functional group, a vertical alignment functional group, a horizontal alignment functional group, or a combination thereof; and $Sp^3$ represents a spacer or a direct bond.

Preferred examples of the polyimide-based first polymer include those containing at least one structure represented by any of the following formulas (5) and (6). These may be used alone or in combination with each other.

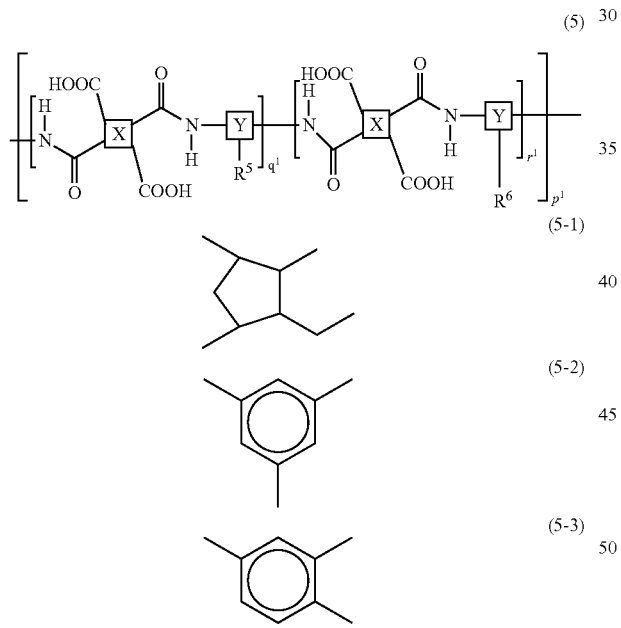

(5)

(5-1)

(5-2)

(5-3)

In the formula, X represents a group represented by the above formula (5-1);

Y represents a group represented by the above formula (5-2) or (5-3);

$p^1$ represents a degree of polymerization, and $p^1$, $q^1$, and $r^1$ are each independently an integer of 1 or greater, and $q^1$ and $r^1$ satisfy $0<r^1/(q^1+r^1)\leq 1$, preferably $0<r^1/(q^1+r^1)\leq 0.5$, more preferably $0<r^1/(q^1+r^1)\leq 0.4$;

$R^5$ is a photo-functional group, a vertical alignment functional group, a horizontal alignment functional group, or a combination thereof; and $R^6$ represents a group represented by the following formula (5-4) or (5-5).

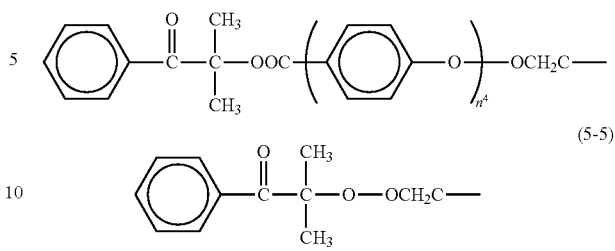

(5-4)

(5-5)

In the formulas, $n^4$ is an integer of 1 to 3, preferably 1.

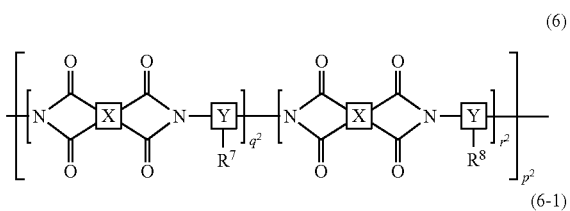

(6)

(6-1)

(6-2)

(6-3)

In the formula, X represents a group represented by the above formula (6-1);

Y represents a group represented by the above formula (6-2) or (6-3);

$p^2$ represents a degree of polymerization, and $p^2$, $q^2$, and $r^2$ are each independently an integer of 1 or greater, and $q^2$ and $r^2$ satisfy $0<r^2/(q^2+r^2)\leq 1$, preferably $0<r^2/(q^2+r^2)\leq 0.5$, more preferably $0<r^2/(q^2+r^2)\leq 0.4$;

$R^7$ is a photo-functional group, a vertical alignment functional group, a horizontal alignment functional group, or a combination thereof; and $R^8$ represents a group represented by the following formula (6-4) or (6-5).

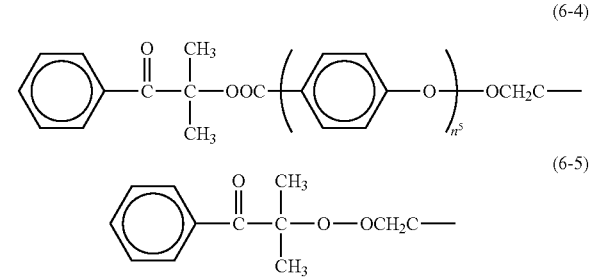

(6-4)

(6-5)

In the formulas, $n^5$ is an integer of 1 to 3, preferably 1.

The first polymer preferably contains at least one photo-functional group, more preferably at least one photo-functional group selected from the group consisting of a cinnamate group, an azobenzene group, a chalcone group, and a coumarin group, each of which optionally contains a substituent.

Preferred examples of the substituent include, but are not limited to, a halogen group, a methyl group, a methoxy group, an ethyl group, and an ethoxy group. These may be used alone or in combination with each other. In other words, the substituent preferably includes at least one substituent selected from the group consisting of a halogen group, a methyl group, a methoxy group, an ethyl group, and an ethoxy group. The halogen group is preferably a fluoro group or a chloro group. In the case where the photo-functional group contains a substituent, the substituent usually replaces at least one hydrogen atom in a ring structure, such as a phenylene group, of the photo-functional group. The photo-functional group may be a monovalent functional group, but is preferably a divalent cinnamate group represented by the following formula (II-1), a divalent azobenzene group represented by the following formula (II-2), a divalent chalcone group represented by the following formula (II-3), or a divalent coumarin group represented by the following formula (II-4).

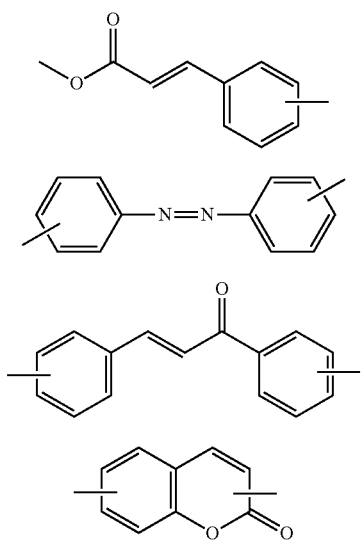

(II-1)

(II-2)

(II-3)

(II-4)

Each of the polymer layers 31 and 51 contains a second polymer obtained by polymerizing at least one monomer including at least one monomer represented by the following formula (2) (hereinafter, also referred to as the monomer (2)). The liquid crystal display device of the present embodiment may be in the vertical alignment mode, or may be in the horizontal alignment mode. Each of the polymer layers 31 and 51 may align liquid crystal compounds in the liquid crystal layer 40 in the direction perpendicular to or parallel to the surfaces of the substrates 20 and 60. Aligning liquid crystal compounds in the liquid crystal layer 40 in the direction perpendicular to the surfaces of the substrates 20 and 60 means that the pre-tilt angle of the liquid crystal material from the surfaces of the substrates 20 and 60 is 85° or greater and 90° or smaller, preferably 86° or greater and 90° or smaller. Aligning liquid crystal compounds in the liquid crystal layer 40 in the direction parallel to the surfaces of the substrates 20 and 60 means that the pre-tilt angle of the liquid crystal material from the surfaces of the substrates 20 and 60 is 0° or greater and 5° or smaller, preferably 0° or greater and 3° or smaller. The second polymer may include monomer (2)-derived units as main units or may be composed of the monomer (2)-derived units alone. At least some molecules of the second polymer in each of the polymer layers 31 and 51 are covalently bonded through a reaction to the at least one structure represented by the formula (1) (and radicals thereof). As described above, the second polymer is preferably obtained by radically polymerizing the at least one monomer.

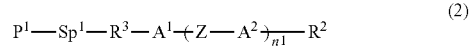

(2)

In the formula, $R^2$ represents a $—R^3\text{-}Sp^1\text{-}P^1$ group, a hydrogen atom, a halogen atom, a —CN group, a —$NO_2$ group, a —NCO group, a —NCS group, a —OCN group, a —SCN group, a —$SF_5$ group, or a C1-C18 linear or branched alkyl group;

$P^1$ represents a radically polymerizable group;

$Sp^1$ represents a C1-C6 linear, branched, or cyclic alkylene or alkyleneoxy group, or a direct bond;

a hydrogen atom in $R^2$ is optionally replaced by a fluorine atom or a chlorine atom;

a —$CH_2$— group in $R^2$ is optionally replaced by a —O— group, a —S— group, a —NH— group, a —CO— group, a —COO— group, a —OCO— group, a —O—COO— group, a —$OCH_2$— group, a —$CH_2O$— group, a —$SCH_2$— group, a —$CH_2S$— group, a —$N(CH_3)$— group, a —$N(C_2H_5)$— group, a —$N(C_3H_7)$— group, a —$N(C_4H_9)$— group, a —$CF_2O$— group, a —$OCF_2$— group, a —$CF_2S$— group, a —$SCF_2$— group, a —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, or a —OCO—CH=CH— group, unless otherwise an oxygen atom and a sulfur atom are adjacent to each other;

$R^3$ represents a —O— group, a —S— group, a —NH— group, a —CO— group, a —COO— group, a —OCO— group, a —O—COO— group, a —$OCH_2$— group, a —$CH_2O$— group, a —$SCH_2$— group, a —$CH_2S$— group, a —$N(CH_3)$— group, a —$N(C_2H_5)$— group, a —$N(C_3H_7)$— group, a —$N(C_4H_9)$— group, a —$CF_2O$— group, a —$OCF_2$— group, a —$CF_2S$— group, a —$SCF_2$— group, a —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, a —OCO—CH=CH— group, or a direct bond;

$A^1$ and $A^2$ are the same as or different from each other and each represent a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2,2,2]octylene group, a piperidine-1,4-diyl group, a decahydronaphthalene-2,6-diyl group, a 1,2,3,4-tetrahydronaphthalene-2,6-diyl group, an indane-1,3-diyl group, an indane-1,5-diyl group, an indane-2,5-diyl group, a phenanthrene-1,6-diyl group, a phenanthrene-1,8-diyl group, a phenanthrene-2,7-diyl group, or a phenanthrene-3,6-diyl group;

a —CH$_2$— group in each of A$^1$ and A$^2$ is optionally replaced by a —O— group or a —S— group, unless otherwise an oxygen atom and a sulfur atom are adjacent to each other;

a hydrogen atom in each of A$^1$ and A$^2$ is optionally replaced by a fluorine atom, a chlorine atom, a —CN group, or a C1-C6 alkyl, alkoxy, alkylcarbonyl, alkoxycarbonyl, or alkylcarbonyloxy group;

Z represents a —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, a —OCO—CH=CH— group, or a direct bond; and n$^1$ is 0, 1, or 2.

Specific preferred examples of the monomer (2) include monomers represented by any of the following formulas (7-1) to (7-5). These may be used alone or in combination with each other.

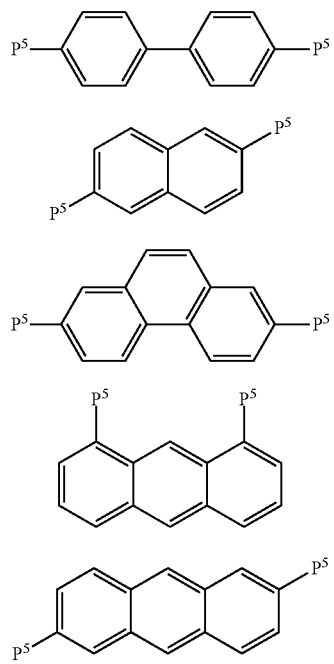

In the formulas, P$^5$ represents a radically polymerizable group.

Examples of the radically polymerizable group in the monomers represented by any of the above formulas (2) and (7-1) to (7-5) include acrylate, methacrylate, acrylamide, methacrylamide, vinyl, and vinyloxy groups. These may be used alone or in combination with each other.

The liquid crystal layer 40 contains a liquid crystal material (nematic liquid crystal) containing at least one liquid crystal compound (liquid crystal molecules) and exhibiting a nematic phase. The liquid crystal material transforms from the nematic phase into an isotropic phase when the temperature being increased from the nematic temperature reaches a certain critical temperature (nematic-isotropic phase transition temperature (Tni)). The nematic-isotropic phase transition temperature of the liquid crystal material may be any temperature, such as a temperature of 70° C. to 110° C. The Tni is that of the liquid crystal material before the above monomer is added. The liquid crystal layer 40 contains liquid crystal compounds aligned in a predetermined direction with no voltage applied. The predetermined direction (initial alignment direction) is appropriately determined according to the liquid crystal driving mode. For example, in the horizontal alignment mode, the liquid crystal compounds are aligned in a direction substantially parallel to a main surface of each of the substrates 20 and 60 with no voltage applied. In the vertical alignment mode, the liquid crystal compounds are aligned in a direction substantially perpendicular to the main surface of each of the substrates 20 and 60 with no voltage applied.

The anisotropy of dielectric constant (Δε) represented by the following formula of the liquid crystal material and the liquid crystal compound may be positive or negative. The liquid crystal material may also contain a liquid crystal compound having no polarity, i.e., having an anisotropy Δε of substantially 0 (neutral liquid crystal compound). Examples of the neutral liquid crystal compound include liquid crystal compounds having an alkene structure.

Δε=(dielectric constant in major axis direction)–(dielectric constant in minor axis direction)

The thin-film transistor (TFT) substrate 60 can be an active matrix substrate usually used in the field of liquid crystal display panels. The liquid crystal driving mode for the liquid crystal display device of the present embodiment may be any mode such as the twisted nematic (TN) mode, the electrically controlled birefringence (ECB) mode, a horizontal alignment mode including the FFS mode and the IPS mode, or a vertical alignment mode including the 4D-RTN mode and the multi-domain vertical alignment (MVA) mode.

In the case where the liquid crystal driving mode of the liquid crystal display device of the present embodiment is the FFS mode, the TFT substrate 60 includes, for example, a supporting substrate, a common electrode (planar electrode) disposed on the liquid crystal layer 40 side of the supporting substrate, an insulating film covering the common electrode, and pixel electrodes (comb electrodes) disposed on the liquid crystal layer 40 side of the insulating film. This structure can generate horizontal electric fields (fringe electric fields) in the liquid crystal layer 40 by applying voltage between the common electrode and the pixel electrodes constituting a pair of electrodes. Thus, controlling the voltage applied between the common electrode and the pixel electrodes enables control of the alignment of the liquid crystals in the liquid crystal layer 40.

In the case where the liquid crystal driving mode for the liquid crystal display device of the present embodiment is the IPS mode, the liquid crystal display device applies voltage to the pair of comb electrodes disposed in the TFT substrate 60 to generate horizontal electric fields in the liquid crystal layer 40, thereby controlling the alignment of the liquid crystals in the liquid crystal layer 40.

In the case where the liquid crystal driving mode for the liquid crystal display device of the present embodiment is the vertical alignment mode, the TFT substrate 60 includes pixel electrodes, and the counter substrate 20 includes a common electrode. The liquid crystal display device applies voltage between the common electrode and the pixel electrodes to generate vertical electric fields in the liquid crystal layer 40, thereby controlling the alignment of the liquid crystals in the liquid crystal layer 40. In the 4D-RTN mode, the alignment films 30 and 50 are subjected to alignment treatment in opposite (antiparallel) directions in each pixel, and the TFT substrate 60 and the counter substrate 20 are bonded to each other such that the alignment treatment directions for the alignment films 30 and 50 are perpendicular to each other. This can define four alignment directions (domains), which are different from each other, in each pixel. In the MVA mode, alignment control structures such as ribs and slits are provided to the TFT substrate 60 and the counter substrate 20 to define different alignment directions (domains) in each pixel.

The second linear polarizer 70 can be the same polarizer as that used for the first linear polarizer 10. The transmission axis of the first linear polarizer 10 and the transmission axis of the second linear polarizer 70 are preferably perpendicular to each other. This configuration sets the first linear polarizer 10 and the second linear polarizer 70 in crossed Nicols, achieving a favorable black display state with no voltage applied.

The backlight 80 may be of any type and may be, for example, an edge-lit backlight or a direct-lit backlight. The backlight 80 may utilize any light source such as a light emitting diode (LED) or a cold cathode fluorescent lamp (CCFL). The amount of light emitted from the backlight 80 and transmitted by the liquid crystal panel is controlled by the voltage applied to the liquid crystal layer 40.

The liquid crystal display device of Embodiment 1 may include any other members. For example, with an anti-reflection film disposed on the viewing surface side of the first linear polarizer 10, the reflectance of the liquid crystal panel can be further decreased. The anti-reflection film is preferably a moth-eye film having a surface structure like a moth's eye.

The method for producing the liquid crystal display device of the present embodiment is described.

First, the counter substrate 20 and the TFT substrate 60 are produced by common methods to prepare the counter substrate 20 and the TFT substrate 60 as a pair of substrates (preparation process).

The preparation is followed by applying an alignment agent containing a first polymer containing in a side chain at least one structure represented by the above formula (1) to the surface of each of the substrates 20 and 60 so as to form an alignment film (film forming process). Specifically, an alignment agent is prepared by dissolving the first polymer in a solvent (for example, organic solvent). To the surface of each of the substrates 20 and 60 is applied the alignment agent by a method such as roll coating, spin coating, printing, or ink jetting. The surface of each of the substrates 20 and 60 is heated to volatilize the solvent in the alignment agent, whereby the alignment films 30 and 50 are formed. The heating may include two processes of pre-baking and post-baking. The post-baking may include two processes, so that a total of three heating processes may be performed. In the case of using the polyimide-based first polymer, the post-baking may involve partial imidization of a polyamic acid structure into a polyimide structure.

Thereafter, the alignment films 30 and 50 may or may not be subjected to alignment treatment. Examples of the alignment treatment include rubbing and photoalignment treatments such as ultraviolet light irradiation. In a typical horizontal alignment mode, the horizontal alignment films are subjected to an alignment treatment.

Between the substrates 20 and 60 having formed thereon the alignment films 30 and 50, respectively, is formed the liquid crystal layer 40 by sealing a liquid crystal composition containing a liquid crystal material and at least one monomer (hereinafter, also referred to as an additional monomer) including at least one monomer represented by the formula (2) (monomer (2)) (liquid crystal layer formation). The liquid crystal layer formation is achieved by vacuum filling or one drop filling. The amount of the additional monomer to be introduced is preferably 0.01 to 5 wt %, more preferably 0.05 to 0.8 wt %, relative to the whole liquid crystal composition. The additional monomer may include the monomer (2) as a main monomer or may be composed of the monomer (2) alone. In the case of employing the vacuum filling, processes are performed in the following order: application of a sealant; bonding of the substrates 20 and 60; curing of the sealant; injection of the liquid crystal composition; and sealing of the injection ports. In the case of employing the one drop filling, processes are performed in the following order: application of a sealant; dropping of the liquid crystal composition; bonding of the substrates 20 and 60; and curing of the sealant. These result in a liquid crystal cell filled with the liquid crystal material.

The liquid crystal layer 40 between the substrates 20 and 60 is then heated to transform the liquid crystal material into an isotropic phase (isotropic phase treatment). The heating temperature here may be any temperature higher than the nematic-isotropic phase transition temperature of the liquid crystal material and is, for example, 80° C. to 150° C. The heating duration is, for example, 30 to 60 minutes. The isotropic phase treatment is followed by cooling the liquid crystal cell to room temperature.

After the isotropic phase treatment, the liquid crystal layer 40 is irradiated with ultraviolet light to form the polymer layers 31 and 51 from the second polymer obtained by polymerizing the additional monomer including the monomer (2) between the liquid crystal layer 40 and the alignment films 30 and 50 (polymer layer formation), respectively. The ultraviolet light applied may be polarized ultraviolet light, but is preferably unpolarized ultraviolet light.

The ultraviolet light may have a wavelength of 200 to 430 nm. The lower limit of the wavelength is more preferably 250 nm, and the upper limit is more preferably 380 nm. The ultraviolet light may be applied with an irradiation dose of 0.3 to 20 J/cm$^2$. The lower limit of the irradiation dose is more preferably 1 J/cm$^2$, and the upper limit is more preferably 5 J/cm$^2$.

In the case of the vertical alignment mode, the polymer layer formation may include applying unpolarized ultraviolet rays while applying voltage (for example, 4 to 10 V) to the liquid crystal layer 40.

Performing the polymer layer formation after the liquid crystal layer formation enables bonding of the substrates 20 and 60, which hold the liquid crystal layer 40 in between, to each other with the sealant and formation of the polymer layers 31 and 51 in a region surrounded by the sealant in a plan view.

The above processes are followed by bonding of polarizers and mounting of members such as a controller, a power source, and a backlight. Thereby, the liquid crystal display device of the present embodiment is completed.

An embodiment of the present invention was described above. Each and every feature of the embodiment is applicable to all the aspects of the present invention.

The present invention is described in more detail below based on examples and comparative examples. The examples, however, are not intended to limit the scope of the present invention.

Synthesis Example 1

The following shows an exemplary synthesis of a diamine monomer containing a 2-hydroxy-2-methyl-1-phenyl-propan-1-one functional group in a side chain.

Process A

An amount of 3 g of dinitrophenyl acetate (13.3 mmol, compound (A)) was dissolved in 8 mL of SOLMIX AP-I, followed by addition of 0.06 g of Raney Ni to the solution. The mixture was fed into an autoclave. The system was purged with hydrogen and left to stand overnight at room temperature under a pressure of 0.4 MPa. High performance liquid chromatography (HPLC) was used to confirm that the reaction was completed, and then the reaction liquid was filtered through Celite. The filtrate was concentrated until no filtrate was observed. The thus-obtained crude liquid was distilled under reduced pressure, so that 1.98 g of 2,4-diaminophenyl acetate (B) (11.9 mmol, yield: 90%) was obtained. Then, 1.8 g of the compound (B) (10.8 mmol) was dissolved in 5 mL of acetone, followed by dropwise addition of t-butoxycarbonyl anhydride (5 g/THF 5 mL) into the solution. The resulting mixture was heated to the reflux temperature and left to stand overnight. After the completion of the reaction, the reaction liquid was concentrated and dried, whereby a Boc compound (C) (3.73 g, 10.2 mmol, yield: 94%) was obtained.

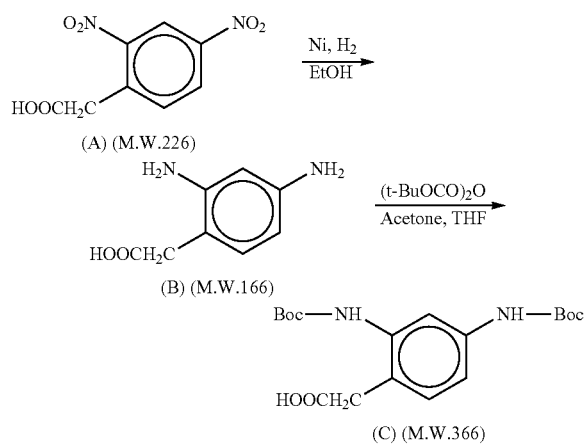

Process B

Into a benzene solution (30 mL) containing 3.5 g (9.56 mmol) of the Boc compound (C) was dropwise added thionyl chloride, so that an acid chloride compound represented by the following formula (D) (3.42 g, 8.89 mmol, yield: 93%) was synthesized. Into a benzene solution (30 mL) containing 1.65 g (10 mmol) of ethyl 4-hydroxybenzoate represented by the following formula (E) and 1.5 g (15 mmol) of triethylamine was dropwise added a benzene solution (20 mL) containing 3.3 g (8.5 mmol) of the acid chloride compound represented by the following formula (D) at room temperature in a nitrogen atmosphere. The mixture was reacted for two hours at room temperature. After the completion of the reaction, impurities were extracted with water, and the residue was purified by column chromatography (toluene/ethyl acetate (4/1)), whereby 4.11 g of the target compound represented by the following formula (F) was obtained (yield: 80%).

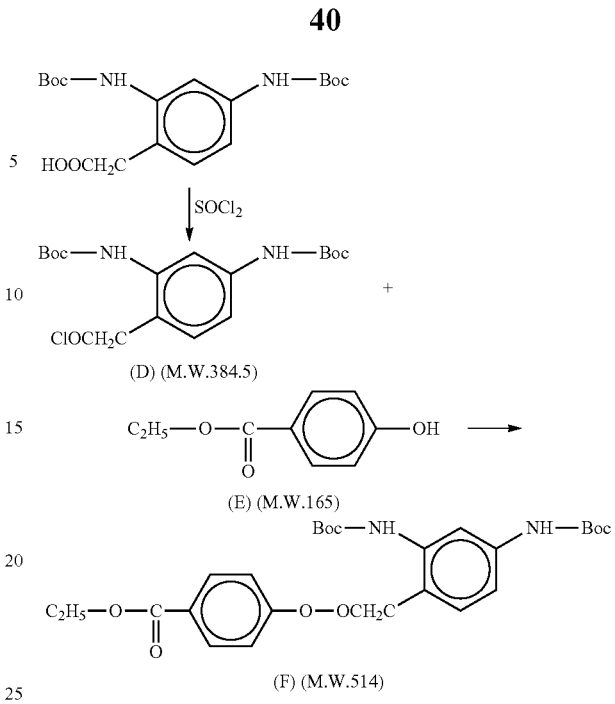

Process C

Into a THF/methanol mixed solution (20 mL) containing 2.57 g (5 mmol) of a compound represented by the formula (F) was dropwise added a sodium hydroxide aqueous solution and then hydrochloric acid. The resulting mixture was stirred for one hour, so that a carboxylic acid compound represented by the following formula (G) was synthesized (2.33 g, 4.8 mmol).

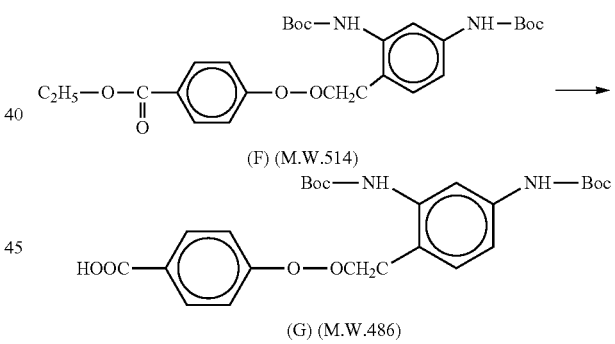

Process D

Thionyl chloride was dropwise added into a benzene solution (30 mL) containing 2.19 g (4.5 mmol) of a compound represented by the formula (G), so that an acid chloride compound (2.24 g, 4.3 mmol, yield: 96%) was synthesized. Into a benzene solution (30 mL) containing 0.82 g (5 mmol) of 2-hydroxy-2-methyl-1-phenyl-propan-1-one represented by the following formula (I) and 1.5 g (15 mmol) of triethylamine was dropwise added a benzene solution (20 mL) containing 2.24 g (4.3 mmol) of an acid chloride compound represented by the following formula (H) at room temperature in a nitrogen atmosphere. The mixture was reacted for two hours at room temperature. After the completion of the reaction, impurities were extracted with water, and the residue was purified by column chromatography (toluene/ethyl acetate (4/1)), whereby 2.26 g of the target compound represented by the following formula (J) (3.57 mmol, yield: 83%) was obtained.

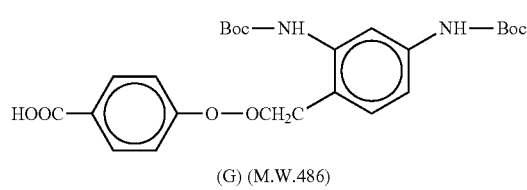

(G) (M.W.486)

↓ SOCl₂

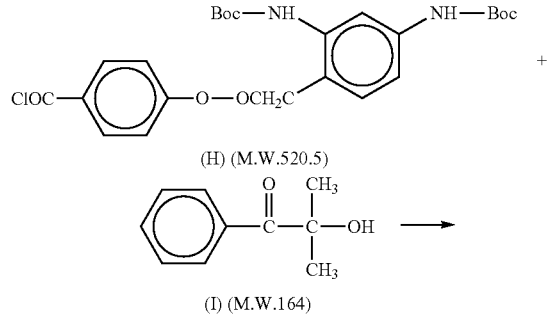

(H) (M.W.520.5)

+

(I) (M.W.164)

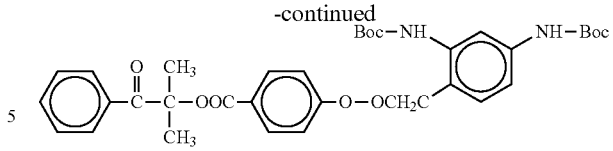

(J) (M.W.632)

Process E

The compound (J) was dissolved in methylene chloride, followed by adding tin(II) trifluoromethanesulfonate (Sn(OTf)₂) in portions to the solution at 0° C. The mixture was reacted at room temperature, and then neutralized with 5% NaHCO₃aq. The mixture was washed with water until it had a neutral pH. The organic layer was dried over anhydrous magnesium sulfate and filtered through Celite. The filtrate was concentrated, whereby the target diamine monomer (K) (1.13 g, 2.61 mmol, yield: 73%) was obtained.

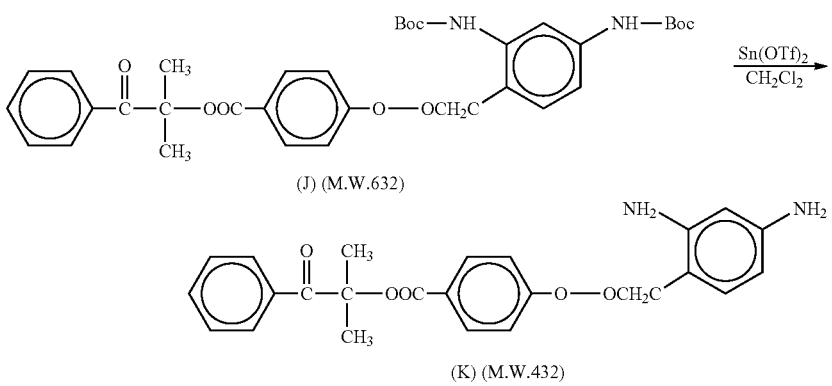

With the compound (D) and the compound (I) in place of the compound (H), a diamine monomer represented by the following formula (L) can be synthesized in the same manner.

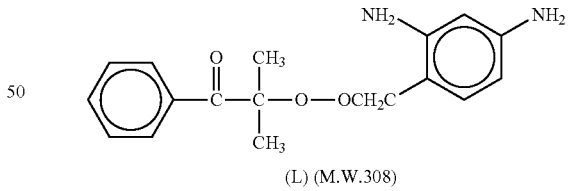

(L) (M.W.308)

Condensation Polymerization Example 1

The following shows an exemplary synthesis with 10 mol % of a polymerization initiator group-containing diamine unit introduced.

The following acid anhydride (0.10 mol) was added to a γ-butyrolactone solution containing the following photo-functional group-containing diamine (0.09 mol) and the following 2-hydroxy-2-methyl-1-phenyl-propan-1-one functional group-containing diamine (0.01 mol), and the mixture was reacted at 60° C. for 12 hours, whereby a polyamic acid having a random structure was obtained.

Synthesis Example 1 - Compound (K)

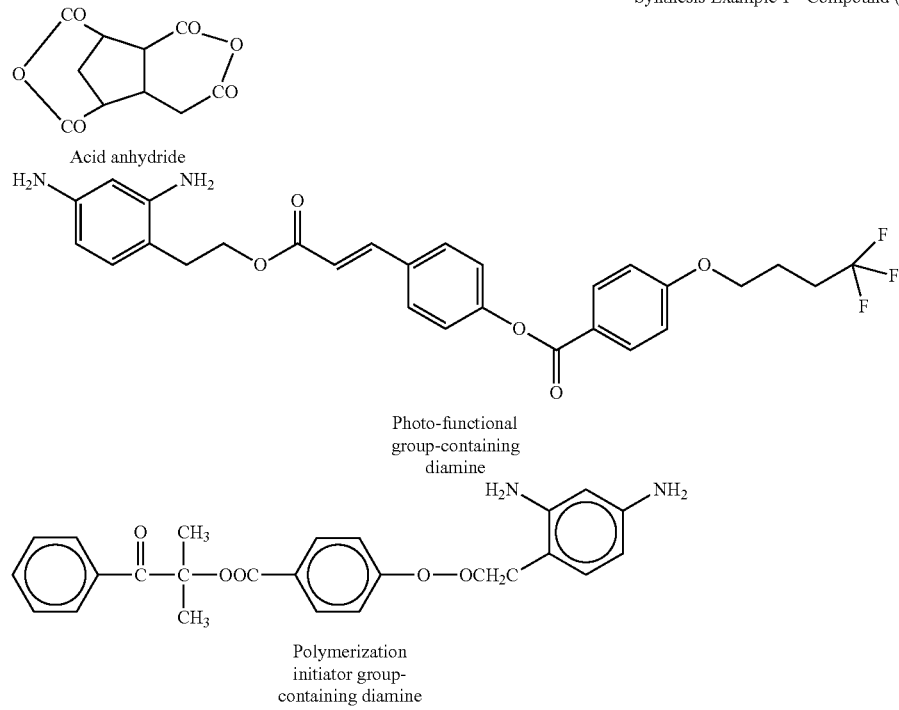

Acid anhydride

Photo-functional group-containing diamine

Polymerization initiator group-containing diamine

Condensation Polymerization Example 2

The following shows an exemplary synthesis with 10 mol % of a polymerization initiator group-containing diamine unit introduced.

The following acid anhydride (0.10 mol) was added to a γ-butyrolactone solution containing the following horizontal alignment photo-functional group-containing diamine (0.09 mol) and the following 2-hydroxy-2-methyl-1-phenyl-propan-1-one functional group-containing diamine (0.01 mol), and the mixture was reacted at 60° C. for 12 hours, whereby a polyamic acid having a random structure was obtained.

Synthesis Example 1 - Compound (L)

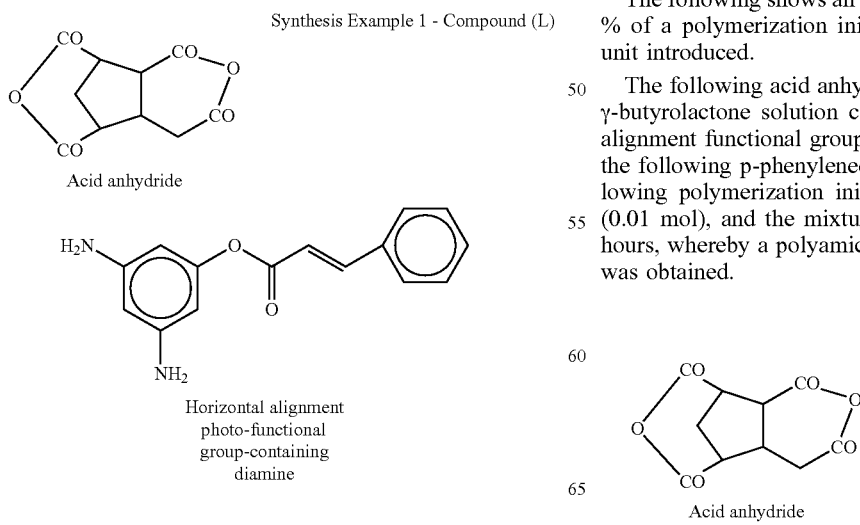

Acid anhydride

Horizontal alignment photo-functional group-containing diamine

-continued

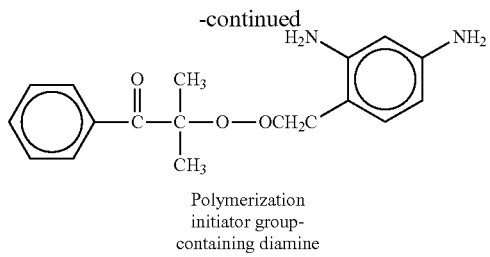

Polymerization initiator group-containing diamine

Condensation Polymerization Example 3

The following shows an exemplary synthesis with 10 mol % of a polymerization initiator group-containing diamine unit introduced.

The following acid anhydride (0.10 mol) was added to a γ-butyrolactone solution containing the following vertical alignment functional group-containing diamine (0.03 mol), the following p-phenylenediamine (0.06 mol), and the following polymerization initiator group-containing diamine (0.01 mol), and the mixture was reacted at 60° C. for 12 hours, whereby a polyamic acid having a random structure was obtained.

Synthesis Example 1 - Compound (K)

Acid anhydride

-continued

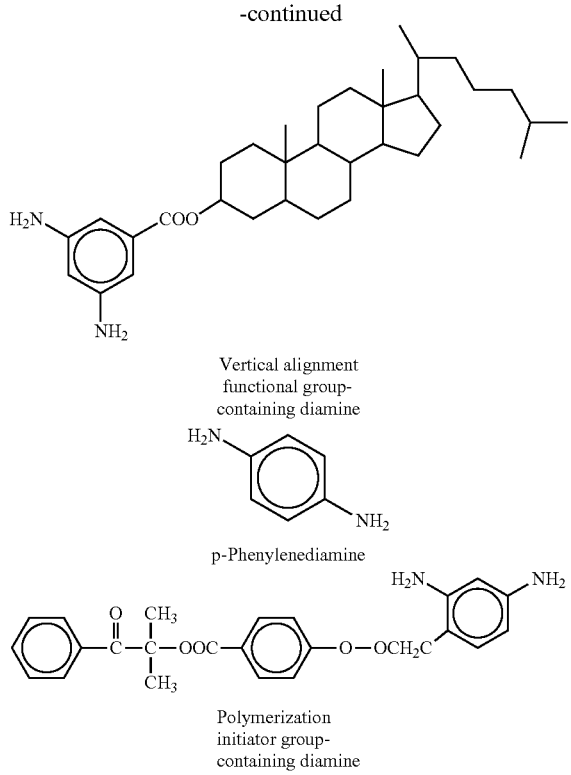

Vertical alignment functional group-containing diamine p-Phenylenediamine

Polymerization initiator group-containing diamine

Example 1-1

(Production of Liquid Crystal Cell)

A pair of substrates each having an ITO electrode on its entire surface was prepared. A vertical photo-alignment film was formed on each of the substrates using a polyamic acid containing in a side chain an initiator functional group synthesized as in Condensation Polymerization Example 1 and a vertical alignment photo-functional group. The amount m of the initiator functional group-containing diamine unit introduced into the polyamic acid was 10 mol %. The film formation included pre-baking the applied alignment agent at 80° C. for five minutes and then post-baking it at 200° C. for 40 minutes. The alignment agent was then obliquely irradiated with polarized ultraviolet light with an intensity of 20 mJ/cm² for an alignment treatment which enables the alignment films to give a pre-tilt angle of 88.5° (substantially vertical alignment). A seal was applied to one of the substrates, and beads were scattered on the other substrate. The substrates were then bonded to each other. Between the substrates was injected a liquid crystal material having negative anisotropy of dielectric constant (Tni=85° C., Δn=0.11, Δε=−3.2). The liquid crystal material contained 0.6 wt % of a phenanthrene group-containing bifunctional monomer represented by the following formula (14). The liquid crystal material injection was followed by heating at 130° C. and quenching. The liquid crystal cell was irradiated with unpolarized ultraviolet light having a wavelength of 365 nm for 30 minutes (irradiation dose: 3 J/cm²) using a black light (FHF-32BLB from Toshiba Lighting and Technology Corporation) with a cell temperature of 35° C. to polymerize the monomer, and thereby a 4D-RTN mode liquid crystal cell was obtained. In the irradiation, ultraviolet light having a wavelength of 330 nm or shorter was blocked by a cut-off filter. The polymerization reaction was caused without application of voltage to the liquid crystal cell.

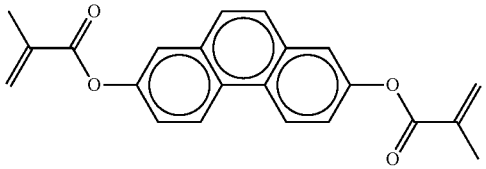

(14)

Examples 1-2 and 1-3

4D-RTN mode liquid crystal cells of Examples 1-2 and 1-3 were produced as in Example 1-1, except that the amount m of the initiator functional group-containing diamine unit introduced into the polyamic acid was changed to 20 mol % and 30 mol %, respectively.

Comparative Example 1-1

A 4D-RTN mode liquid crystal cell of Comparative Example 1-1 was produced as in Example 1-1, except that the amount m of the initiator functional group-containing diamine unit introduced into the polyamic acid was changed to 0 mol %.

Examples 1-4 to 1-6

4D-RTN mode liquid crystal cells of Examples 1-4, 1-5, and 1-6 were produced as in Examples 1-1, 1-2, and 1-3, respectively, except that the liquid crystal material contained 0.3 wt % of a biphenyl group-containing bifunctional monomer represented by the following formula (15) instead of the monomer represented by the formula (14).

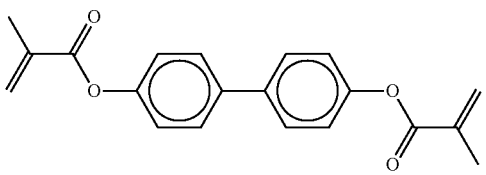

(15)

Comparative Example 1-2

A 4D-RTN mode liquid crystal cell of Comparative Example 1-2 was produced as in Comparative Example 1-1, except that the liquid crystal material contained 0.3 wt % of a biphenyl group-containing bifunctional monomer represented by the formula (15) instead of the monomer represented by the formula (14).

(Backlight Exposure Power-on Test)

Each of the produced liquid crystal cells was sandwiched between polarizers and then power was supplied to the workpiece on a backlight for 100 hours. The power supply conditions were 10 V and 30 Hz. The voltage holding ratio (VHR), residual DC (rDC) voltage, Δ tilt (amount of change in tilt angle), and residual monomer percentage (percentage of residual monomers in liquid crystal layer) before and after the power supply to the workpiece on the backlight were determined. The VHR was measured at 1 V (70° C.) using a VHR measurement system from Toyo Corp. The rDC voltage was measured at a DC offset voltage of 2 V by the flicker elimination method. The Δ tilt was determined by measuring the initial pre-tilt angle and the pre-tilt angle after the power supply using OMS-5 by crystal rotation, and calculating the amount of change in tilt angle. The residual monomer percentage was determined by measuring the amount of monomers in the liquid crystal layer before and after polymerization by liquid chromatography, and calculating the percentage of the monomers remaining in the liquid crystal layer after the polymerization.

The following Tables 1-1 and 1-2 show the results.

TABLE 1-1

|  | Comparative Example 1-1 | Example 1-1 | Example 1-2 | Example 1-3 |
|---|---|---|---|---|
| Initiator introduced (mol %) | m = 0 | m = 10 | m = 20 | m = 30 |
| VHR (%) | 99.4 | 99.5 | 99.5 | 99.5 |
| rDC (mV) | 30 | 0 | 0 | 0 |
| Δ Tilt (°) | 0.12 | 0.04 | 0.04 | 0.03 |
| Residual monomer percentage (%) | 5 to 10 | 0.1 or lower | 0.1 or lower | 0.1 or lower |

TABLE 1-2

|  | Comparative Example 1-2 | Example 1-4 | Example 1-5 | Example 1-6 |
|---|---|---|---|---|
| Initiator introduced (mol %) | m = 0 | m = 10 | m = 20 | m = 30 |
| VHR (%) | 97.2 | 99.3 | 99.4 | 99.5 |
| rDC (mV) | 220 | 90 | 70 | 70 |
| Δ Tilt (°) | 0.16 | 0.05 | 0.04 | 0.04 |
| Residual monomer percentage (%) | 55 | 0.1 or lower | 0.1 or lower | 0.1 or lower |

As shown in Table 1-1, when the phenanthrene-based monomer was used as the polymerizable monomer, the VHR, rDC, and Δ tilt were improved by introducing an initiator functional group to the alignment film side chain. In contrast, when no initiator functional group was in the alignment film side chain, the residual monomer percentage after ultraviolet light irradiation for 30 minutes was about 5 to 10%, and the VHR, rDC, and Δ tilt were poor.

As shown in Table 1-2, when the biphenyl-based monomer was used as the polymerizable monomer, introduction of no initiator functional group to the alignment film side chain led to a residual monomer percentage of 55%, but introduction of an initiator functional group to the alignment film side chain led to a residual monomer percentage of 0.1% or lower. Also, introduction of an initiator functional group to the alignment film side chain improved the VHR, rDC, and Δ tilt. Particularly, the Δ tilt was decreased (improved) as the amount of the initiator functional group introduced into the alignment film side chain increased.

These results show that when an alignment film is formed using a polymer containing in a side chain a vertical alignment photo-functional group and containing a structure with a self-cleaving polymerization initiator function, a liquid crystal display device with reduced image sticking can be obtained even through short light irradiation duration.

Example 2-1

(Production of Liquid Crystal Cell)

A TFT substrate and a counter substrate with no electrode for the FFS mode were prepared. A horizontal alignment film was formed on each of the TFT substrate and the counter substrate using a polyamic acid containing in a side chain an initiator functional group synthesized as in Condensation Polymerization Example 2 and a horizontal alignment photo-functional group (photo-reactive cinnamate group). The amount m of the initiator functional group-containing diamine unit introduced into the polyamic acid was 10 mol %. The film formation included pre-baking the applied alignment agent at 80° C. for five minutes and then post-baking it at 200° C. for 40 minutes. The alignment agent was then irradiated with polarized ultraviolet light from the normal direction with an intensity of 50 mJ/cm$^2$ for an alignment treatment which enables the alignment films to give a pre-tilt angle of approximately 0° (horizontal alignment). A seal was applied to one of the substrates, and beads were scattered on the counter substrate. The substrates were then bonded to each other. Between the substrates was injected a liquid crystal material having positive anisotropy of dielectric constant (Tni=90° C., Δn=0.10, Δε=6.0). The liquid crystal material contained 0.6 wt % of a phenanthrene group-containing bifunctional monomer represented by the formula (14). The liquid crystal material injection was followed by heating at 130° C. and quenching. The liquid crystal cell was irradiated with unpolarized ultraviolet light having a wavelength of 365 nm for 30 minutes (irradiation dose: 3 J/cm$^2$) using a black light (FHF-32BLB from Toshiba Lighting and Technology Corporation) with a cell temperature of 35° C. to polymerize the monomer, and thereby an FFS mode liquid crystal cell was obtained. In the irradiation, ultraviolet light having a wavelength of 330 nm or shorter was blocked by a cut-off filter. The polymerization reaction was caused without application of voltage to the liquid crystal cell.

Examples 2-2 and 2-3

FFS mode liquid crystal cells of Examples 2-2 and 2-3 were produced as in Example 2-1, except that the amount m of the initiator functional group-containing diamine unit introduced into the polyamic acid was changed to 20 mol % and 30 mol %, respectively.

Comparative Example 2-1

An FFS mode liquid crystal cell of Comparative Example 2-1 was produced as in Example 2-1, except that the amount m of the initiator functional group-containing diamine unit introduced into the polyamic acid was changed to 0 mol %.

Examples 2-4 to 2-6

FFS mode liquid crystal cells of Examples 2-4, 2-5, and 2-6 were produced as in Examples 2-1, 2-2, and 2-3, respectively, except that the liquid crystal material contained 0.3 wt % of a biphenyl group-containing bifunctional monomer represented by the formula (15) instead of the monomer represented by the formula (14).

Comparative Example 2-2

An FFS mode liquid crystal cell of Comparative Example 2-2 was produced as in Comparative Example 2-1, except that the liquid crystal material contained 0.3 wt % of a biphenyl group-containing bifunctional monomer represented by the formula (15) instead of the monomer represented by the formula (14).

The liquid crystal cells were subjected to the same evaluations (except for the Δ tilt determination) as in Example 1-1 and the other examples. The results are shown in the following Tables 2-1 and 2-2.

TABLE 2-1

|  | Comparative Example 2-1 | Example 2-1 | Example 2-2 | Example 2-3 |
|---|---|---|---|---|
| Initiator introduced (mol %) | m = 0 | m = 10 | m = 20 | m = 30 |
| VHR (%) | 99.1 | 99.3 | 99.4 | 99.4 |
| rDC (mV) | 40 | 10 | 0 | 0 |
| Residual monomer percentage (%) | 5 to 10 | 0.1 or lower | 0.1 or lower | 0.1 or lower |

TABLE 2-2

|  | Comparative Example 2-2 | Example 2-4 | Example 2-5 | Example 2-6 |
|---|---|---|---|---|
| Initiator introduced (mol %) | m = 0 | m = 10 | m = 20 | m = 30 |
| VHR (%) | 97.1 | 99.0 | 99.1 | 99.1 |
| rDC (mV) | 320 | 100 | 60 | 30 |
| Residual monomer percentage (%) | 50 | 0.1 or lower | 0.1 or lower | 0.1 or lower |

As shown in Table 2-1, when the phenanthrene-based monomer was used as the polymerizable monomer, the VHR and rDC were improved by introducing an initiator functional group to the alignment film side chain. In contrast, when no initiator functional group was in the alignment film side chain, the residual monomer percentage after ultraviolet light irradiation for 30 minutes was about 5 to 10%, and the VHR and rDC were poor.

As shown in Table 2-2, when the biphenyl-based monomer was used as the polymerizable monomer, introduction of no initiator functional group to the alignment film side chain led to as high a residual monomer percentage as 50%, but introduction of an initiator functional group to the alignment film side chain led to a residual monomer percentage of 0.1% or lower. Also, introduction of an initiator functional group to the alignment film side chain improved the VHR and rDC.

These results show that when an alignment film is formed using a polymer containing in a side chain a horizontal alignment photo-functional group and containing a structure with a self-cleaving polymerization initiator function, a liquid crystal display device with reduced image sticking can be obtained even through short light irradiation duration.

Example 3-1

(Production of Liquid Crystal Cell)

A pair of substrates each having an ITO electrode provided with slits was prepared. A vertical alignment film was formed on each of the substrates using a polyamic acid containing in a side chain an initiator functional group synthesized as in Condensation Polymerization Example 3 and a vertical functional group. The amount m of the initiator functional group-containing diamine unit introduced into the polyamic acid was 10 mol %. The film formation included pre-baking the applied alignment agent at 80° C. for five minutes and then post-baking it at 200° C. for 40 minutes. In the present example, the alignment films were not subjected to any special alignment treatment. Still, the vertical alignment can be achieved. A seal was applied to one of the substrates, and beads were scattered on the other substrate. The substrates were then bonded to each other. Between the substrates was injected a liquid crystal material having negative anisotropy of dielectric constant (Tni=75° C., Δn=0.09, Δε=−2.8). The liquid crystal material contained 0.6 wt % of a phenanthrene group-containing bifunctional monomer represented by the formula (14). The liquid crystal material injection was followed by heating at 130° C. and quenching. The liquid crystal cell was irradiated with unpolarized ultraviolet light having a wavelength of 365 nm for 30 minutes (irradiation dose: 3 J/cm$^2$) using a black light (FHF-32BLB from Toshiba Lighting and Technology Corporation) with a cell temperature of 35° C. to polymerize the monomer while a voltage of 10 V was applied to the liquid crystal cell, and thereby a vertical alignment mode liquid crystal cell was obtained. In the irradiation, ultraviolet light having a wavelength of 330 nm or shorter was blocked by a cut-off filter.

Examples 3-2 and 3-3

Vertical alignment mode liquid crystal cells of Examples 3-2 and 3-3 were produced as in Example 3-1, except that the amount m of the initiator functional group-containing diamine unit introduced into the polyamic acid was changed to 20 mol % and 30 mol %, respectively.

Comparative Example 3-1

A vertical alignment mode liquid crystal cell of Comparative Example 3-1 was produced as in Example 3-1, except that the amount m of the initiator functional group-containing diamine unit introduced into the polyamic acid was changed to 0 mol %.

Examples 3-4 to 3-6

FFS mode liquid crystal cells of Examples 3-4, 3-5, and 3-6 were produced as in Examples 3-1, 3-2, and 3-3, respectively, except that the liquid crystal material contained 0.3 wt % of a biphenyl group-containing bifunctional monomer represented by the formula (15) instead of the monomer represented by the formula (14).

Comparative Example 3-2

An FFS mode liquid crystal cell of Comparative Example 3-2 was produced as in Comparative Example 3-1, except that the liquid crystal material contained 0.3 wt % of a biphenyl group-containing bifunctional monomer represented by the formula (15) instead of the monomer represented by the formula (14).

The liquid crystal cells were subjected to the same evaluations (except for the Δ tilt determination) as in Example 1-1 and the other examples. The results are shown in the following Tables 3-1 and 3-2.

TABLE 3-1

|  | Comparative Example 3-1 | Example 3-1 | Example 3-2 | Example 3-3 |
|---|---|---|---|---|
| Initiator introduced (mol %) | m = 0 | m = 10 | m = 20 | m = 30 |
| VHR (%) | 99.1 | 99.5 | 99.5 | 99.6 |
| rDC (mV) | 50 | 0 | 0 | 0 |
| Residual monomer percentage (%) | 5 to 10 | 0.1 or lower | 0.1 or lower | 0.1 or lower |

TABLE 3-2

|  | Comparative Example 3-2 | Example 3-4 | Example 3-5 | Example 3-6 |
|---|---|---|---|---|
| Initiator introduced (mol %) | m = 0 | m = 10 | m = 20 | m = 30 |
| VHR (%) | 97.2 | 99.5 | 99.5 | 99.5 |
| rDC (mV) | 220 | 60 | 10 | 0 |
| Residual monomer percentage (%) | 55 | 0.1 or lower | 0.1 or lower | 0.1 or lower |

As shown in Table 3-1, when the phenanthrene-based monomer was used as the polymerizable monomer, the VHR and rDC were improved by introducing an initiator functional group to the alignment film side chain. In contrast, when no initiator functional group was in the alignment film side chain, the residual monomer percentage after ultraviolet light irradiation for 30 minutes was about 5 to 10%, and the VHR and rDC were poor.

As shown in Table 3-2, when the biphenyl-based monomer was used as the polymerizable monomer, introduction of no initiator functional group to the alignment film side chain led to as high a residual monomer percentage as 55%, but introduction of an initiator functional group to the alignment film side chain led to a residual monomer percentage of 0.1% or lower. Also, introduction of an initiator functional group to the alignment film side chain improved the VHR and rDC.

These results show that when an alignment film is formed using a polymer containing in a side chain a vertical alignment functional group and containing a structure with a self-cleaving polymerization initiator function, a liquid crystal display device with reduced image sticking can be obtained even through short light irradiation duration.

[Additional Remarks]

One aspect of the present invention may be a liquid crystal display device including: a pair of substrates; a liquid crystal layer held between the substrates; an alignment film disposed on a liquid crystal layer side surface of at least one of the substrates; and a polymer layer disposed between the liquid crystal layer and the alignment film, the alignment film containing a first polymer containing at least one structure represented by the following formula (1) in a side chain, the polymer layer containing a second polymer obtained by polymerizing at least one monomer including at least one monomer (monomer (2)) represented by the following formula (2),

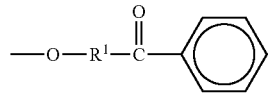  (1)

wherein $R^1$ represents a C3-C6 branched or cyclic alkylene group, and a hydrogen atom at a para position to a carbonyl group in the phenyl group is optionally replaced,

  (2)

wherein $R^2$ represents a —$R^3$-$Sp^1$-$P^1$ group, a hydrogen atom, a halogen atom, a —CN group, a —NO$_2$ group, a —NCO group, a —NCS group, a —OCN group, a —SCN group, a —SF$_5$ group, or a C1-C18 linear or branched alkyl group;

$P^1$ represents a radically polymerizable group;

$Sp^1$ represents a C1-C6 linear, branched, or cyclic alkylene or alkyleneoxy group, or a direct bond;

a hydrogen atom in $R^2$ is optionally replaced by a fluorine atom or a chlorine atom;

a —CH$_2$— group in $R^2$ is optionally replaced by a —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, or a —OCO—CH=CH— group, unless otherwise an oxygen atom and a sulfur atom are adjacent to each other;

$R^3$ represents a —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, a —OCO—CH=CH— group, or a direct bond;

$A^1$ and $A^2$ are the same as or different from each other and each represent a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2,2,2]octylene group, a piperidine-1,4-diyl group, a decahydronaphthalene-2,6-diyl group, a 1,2,3,4-tetrahydronaphthalene-2,6-diyl group, an indane-1,3-diyl group, an indane-1,5-diyl group, an indane-2,5-diyl group, a phenanthrene-1,6-diyl group, a phenanthrene-1,8-diyl group, a phenanthrene-2,7-diyl group, or a phenanthrene-3,6-diyl group;

a —CH$_2$— group in each of A$^1$ and A$^2$ is optionally replaced by a —O— group or a —S— group, unless otherwise an oxygen atom and a sulfur atom are adjacent to each other;

a hydrogen atom in each of A$^1$ and A$^2$ is optionally replaced by a fluorine atom, a chlorine atom, a —CN group, or a C1-C6 alkyl, alkoxy, alkylcarbonyl, alkoxycarbonyl, or alkylcarbonyloxy group;

Z represents a —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, a —OCO—CH=CH— group, or a direct bond; and n$^1$ is 0, 1, or 2.

In the above aspect of the liquid crystal display device, the first polymer in the alignment film contains at least one structure represented by the above formula (1) in a side chain. This configuration enables polymerization of the monomer added to the liquid crystal layer without adding a polymerization initiator or an initiator monomer to the liquid crystal layer. Also, radicals can be generated from this structure and reacted with the monomer added to the liquid crystal layer, so that the alignment film and the second polymer contained in the polymer layer can be covalently bonded to each other. The side chain containing a structure represented by the above formula (1) can be prevented from becoming bulky, so that the steric hindrance between side chain molecules of the first polymer can be reduced. This increases the formation rate of the polymer layer (polymerization rate of the monomer), reducing unreacted monomers remaining in the liquid crystal layer 40 while reducing the ultraviolet light irradiation dose for the liquid crystal layer in the polymer layer formation. These conditions can prevent a change in tilt of the liquid crystal molecules, a VHR decrease, and a residual DC voltage increase even when the liquid crystal display device of the present aspect is used for a long period of time.

The first polymer may contain at least one structure represented by any of the following formulas (1-1) to (1-6) in a side chain,

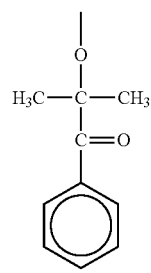

(1-1)

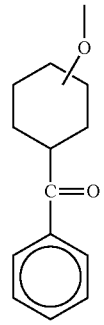

(1-2)

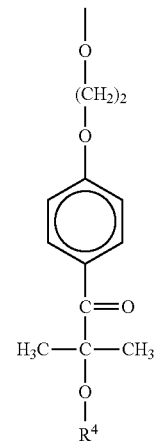

(1-3)

(1-4)

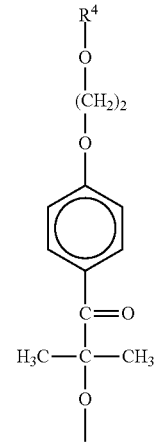

(1-5)

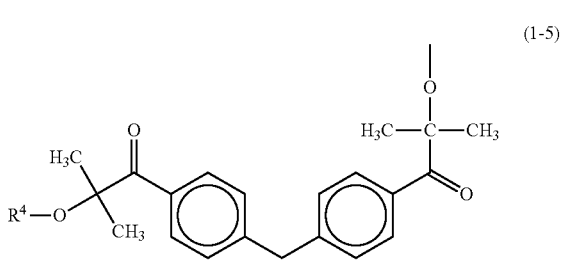

(1-6)

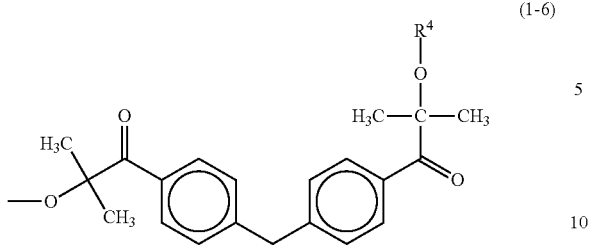

wherein $R^4$s are the same as or different from each other and each represent a C1-C40 saturated or unsaturated hydrocarbon group.

The first polymer may contain a structure represented by the above formula (1-1) in a side chain.

The first polymer may contain at least one structure represented by the following formula (3) in a side chain, (3)

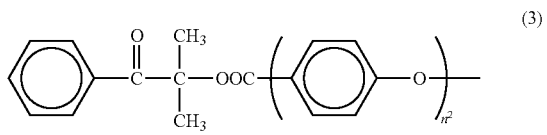

wherein $n^2$ is an integer of 1 to 3.

The first polymer may contain at least one structure represented by any of the following formulas (4-1) and (4-2) in a side chain, (4-1)

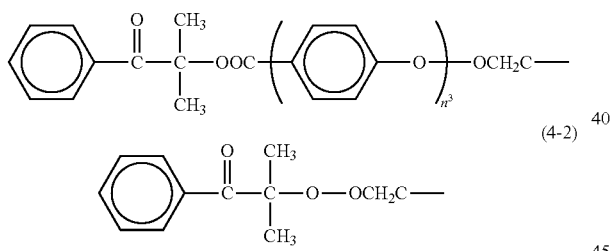

(4-2)

wherein $n^3$ is an integer of 1 to 3.

The first polymer may contain at least one of a polyamic acid structure or a polyimide structure in a main chain.

The first polymer may contain at least one structure represented by any of the following formulas (5) and (6), (5)

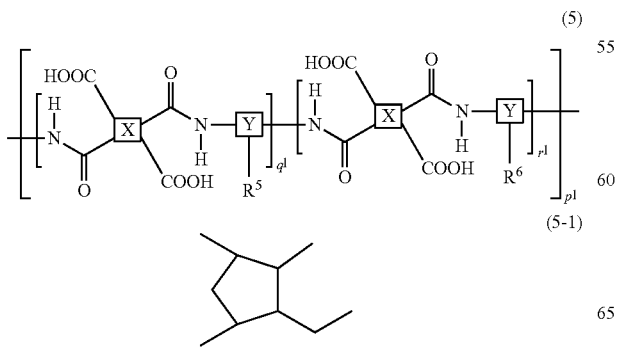

(5-1)

(5-2)

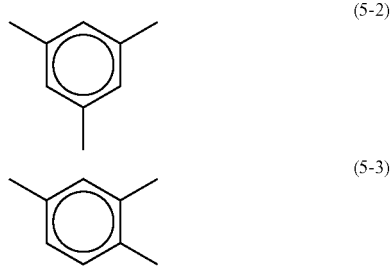

(5-3)

wherein X represents a group represented by the above formula (5-1);

Y represents a group represented by the above formula (5-2) or (5-3);

$p^1$ represents a degree of polymerization, and $p^1$, $q^1$, and $r^1$ are each independently an integer of 1 or greater, and $q^1$ and $r^1$ satisfy $0 < r^1/(q^1+r^1) \leq 1$;

$R^5$ is a photo-functional group, a vertical alignment functional group, a horizontal alignment functional group, or a combination thereof; and $R^6$ represents a group represented by the following formula (5-4) or (5-5), (5-4)

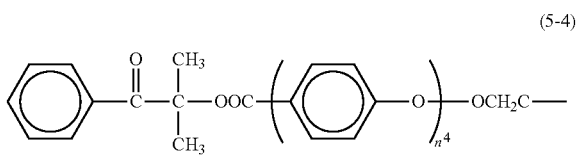

(5-5)

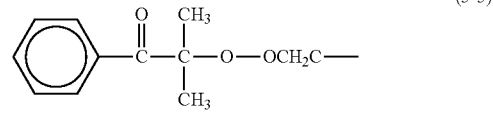

wherein $n^4$ is an integer of 1 to 3, (6)

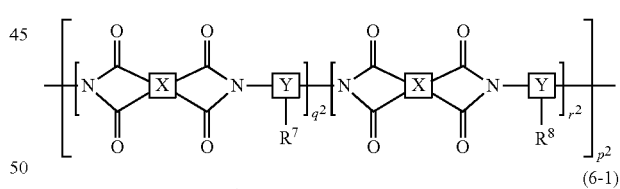

(6-1)

(6-2)

(6-3)

wherein X is a group represented by the above formula (6-1);

Y is a group represented by the above formula (6-2) or (6-3);

$p^2$ represents a degree of polymerization, $p^2$, $q^2$, and $r^2$ are each independently an integer of 1 or greater, and $q^2$ and $r^2$ satisfy $0 < r^2/(q^2+r^2) \le 1$;

$R^7$ is a photo-functional group, a vertical alignment functional group, a horizontal alignment functional group, or a combination thereof; and $R^8$ represents a group represented by the following formula (6-4) or (6-5),

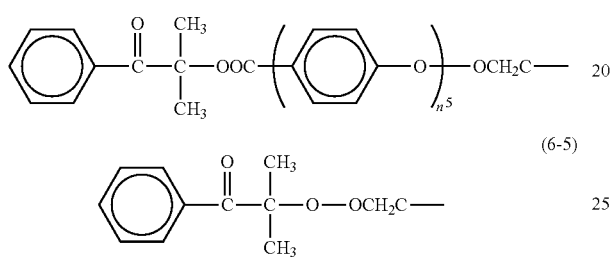

wherein $n^5$ is an integer of 1 to 3.

The first polymer may contain at least one photo-functional group.

The first polymer may contain at least one photo-functional group selected from the group consisting of a cinnamate group, an azobenzene group, a chalcone group, and a coumarin group, each of which optionally contains a substituent.

The second polymer may be a polymer obtained by radically polymerizing the at least one monomer.

The at least one monomer represented by the above formula (2) may include at least one monomer represented by any of the following formulas (7-1) to (7-5),

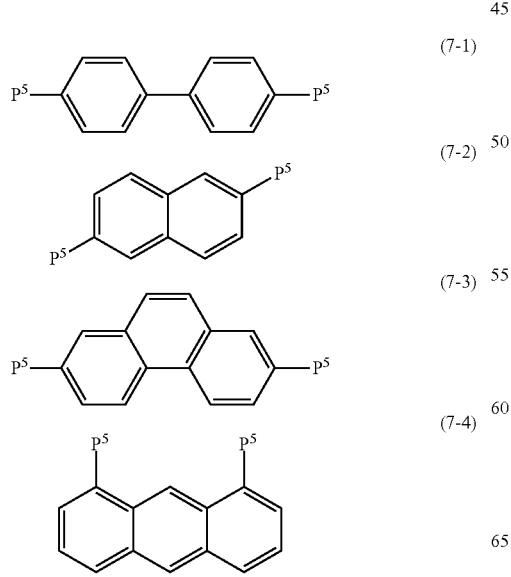

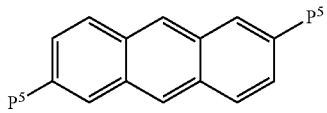

wherein $P^5$ represents a radically polymerizable group.

The liquid crystal display device may be in a liquid crystal driving mode of an MVA mode, a 4D-RTN mode, an FFS mode, or an IPS mode.

What is claimed is:

1. A liquid crystal display device comprising:
   a pair of substrates;
   a liquid crystal layer between the substrates;
   an alignment film disposed on a liquid crystal layer side surface of at least one of the substrates; and
   a polymer layer between the liquid crystal layer and the alignment film,
   the alignment film containing a first polymer containing at least one structure represented by the following formula (1) in a side chain,
   the polymer layer containing a second polymer obtained by polymerizing at least one monomer including at least one monomer represented by the following formula (2),

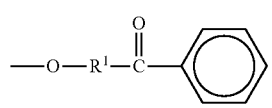

wherein $R^1$ represents a C3-C6 branched or cyclic alkylene group, and a hydrogen atom at a para position to a carbonyl group in the phenyl group is optionally replaced,

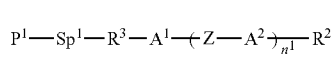

wherein $R^2$ represents a —$R^3$-$Sp^3$-$P^1$ group, a hydrogen atom, a halogen atom, a —CN group, a —NO$_2$ group, a —NCO group, a —NCS group, a —OCN group, a —SCN group, a —SF$_5$ group, or a C1-C18 linear or branched alkyl group;

$P^1$ represents a radically polymerizable group;

$Sp^1$ represents a C1-C6 linear, branched, or cyclic alkylene or alkyleneoxy group, or a direct bond;

a hydrogen atom in $R^2$ is optionally replaced by a fluorine atom or a chlorine atom;

a —CH$_2$— group in $R^2$ is optionally replaced by a —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, or a —OCO—CH=CH— group, unless otherwise an oxygen atom and a sulfur atom are adjacent to each other;

$R^3$ represents a —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, a —OCO—CH=CH— group, or a direct bond;

$A^1$ and $A^2$ are the same as or different from each other and each represent a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2,2,2]octylene group, a piperidine-1,4-diyl group, a decahydronaphthalene-2,6-diyl group, a 1,2,3,4-tetrahydronaphthalene-2,6-diyl group, an indane-1,3-diyl group, an indane-1,5-diyl group, an indane-2,5-diyl group, a phenanthrene-1,6-diyl group, a phenanthrene-1,8-diyl group, a phenanthrene-2,7-diyl group, or a phenanthrene-3,6-diyl group;

a —CH$_2$— group in each of $A^1$ and $A^2$ is optionally replaced by a —O— group or a —S— group, unless otherwise an oxygen atom and a sulfur atom are adjacent to each other;

a hydrogen atom in each of $A^1$ and $A^2$ is optionally replaced by a fluorine atom, a chlorine atom, a —CN group, or a C1-C6 alkyl, alkoxy, alkylcarbonyl, alkoxycarbonyl, or alkylcarbonyloxy group;

Z represents a —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, a —OCO—CH=CH— group, or a direct bond;

n1 is 0, 1, or 2;

wherein the first polymer contains at least one structure represented by any of the following formulas (1-1) to (1-6) in a side chain,

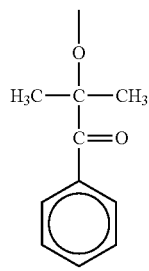

(1-1)

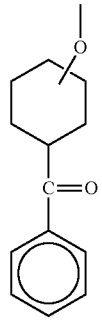

(1-2)

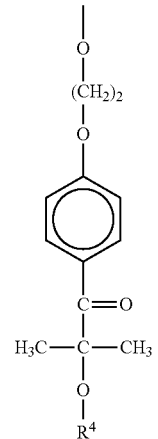

(1-3)

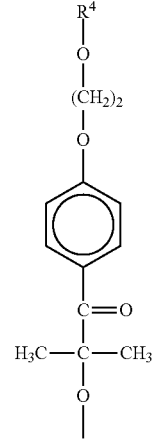

(1-4)

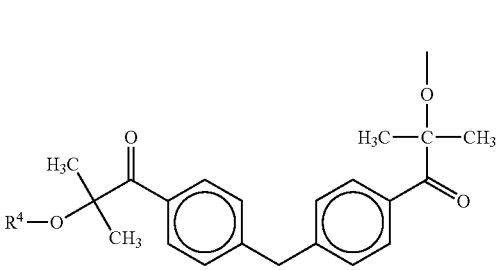

(1-5)

-continued (1-6)

[Structure showing R⁴-O groups and H₃C-C(CH₃) groups attached to phenyl rings connected via CH₂ bridge, with carbonyl groups]

wherein R⁴s are the same as or different from each other and each represent a C1-C40 saturated or unsaturated hydrocarbon group;

wherein the first polymer contains at least one of a polyamic acid structure or a polyimide structure in a main chain;

wherein the first polymer contains at least one structure represented by any of the following formulas (5) and (6) in the main chain, (5)

[Polymer structure with HOOC groups, amide linkages, X and Y groups, R⁵ and R⁶ substituents, with degrees of polymerization $p^1$, $q^1$, $r^1$]

(5-1)

[Cyclopentane structure with ethyl and methyl substituents]

(5-2)

[Benzene ring with three methyl substituents (1,3,5-positions)]

(5-3)

[Benzene ring with methyl substituents]

wherein X represents the group represented by the above formula (5-1);

Y represents the group represented by the above formula (5-2) or (5-3);

$p^1$ represents a degree of polymerization, and $p^1$, $q^1$, and $r^1$ are each independently an integer of 1 or greater, and $q^1$ and $r^1$ satisfy $0 < r^1/(q^1+r^1) \leq 1$;

R⁵ is a photo-functional group, a vertical alignment functional group, a horizontal alignment functional group, or a combination thereof;

R⁶ represents a group represented by the following formula (5-4) or (5-5), (5-4)

[Structure: Ph-C(=O)-C(CH₃)₂-OOC-(C₆H₄-O)$_{n^4}$-OCH₂C-]

(5-5)

[Structure: Ph-C(=O)-C(CH₃)₂-O-OCH₂C-]

wherein $n^4$ is an integer of 1 to 3;

(6)

[Polymer structure with imide linkages, X and Y groups, R⁷ and R⁸ substituents, degrees of polymerization $p^2$, $q^2$, $r^2$]

(6-1)

[Cyclopentane structure with ethyl and methyl substituents]

(6-2)

[Benzene ring with three methyl substituents (1,3,5-positions)]

(6-3)

[Benzene ring with methyl substituents]

wherein X represents the group represented by the above formula (6-1);

Y represents the group represented by the above formula (6-2) or (6-3);

$p^2$ represents a degree of polymerization, $p^2$, $q^2$, and $r^2$ are each independently an integer of 1 or greater, and $q^2$ and $r^2$ satisfy $0 < r^2/(q^2+r^2) \leq 1$;

R⁷ is a photo-functional group, a vertical alignment functional group, a horizontal alignment functional group, or a combination thereof; and R⁸ represents a group represented by the following formula (6-4) or (6-5), (6-4)

[Structure: Ph-C(=O)-C(CH₃)₂-OOC-(C₆H₄-O)$_{n^5}$-OCH₂C-]

(6-5)

[Structure: Ph-C(=O)-C(CH₃)₂-O-OCH₂C-]

wherein $n^5$ is an integer of 1 to 3.

2. The liquid crystal display device according to claim 1, wherein the first polymer contains the structure represented by the above formula (1-1) in a side chain.

3. The liquid crystal display device according to claim 2, wherein the first polymer contains at least one structure represented by the following formula (3) in a side chain,

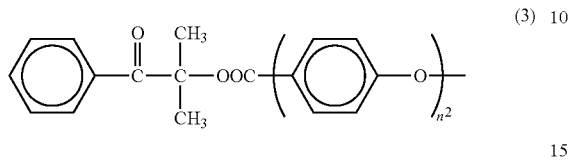
(3)

wherein $n^2$ is an integer of 1 to 3.

4. The liquid crystal display device according to claim 2, wherein the first polymer contains at least one structure represented by any of the following formulas (4-1) and (4-2) in a side chain,

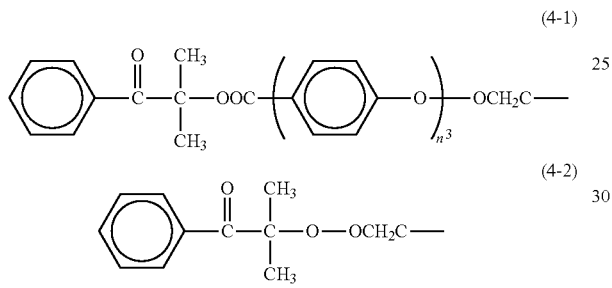
(4-1)
(4-2)

wherein $n^3$ is an integer of 1 to 3.

5. The liquid crystal display device according to claim 1, wherein the first polymer contains at least one photofunctional group.

6. The liquid crystal display device according to claim 5, wherein the first polymer contains at least one photofunctional group selected from the group consisting of a cinnamate group, an azobenzene group, a chalcone group, and a coumarin group, each of which optionally contains a substituent.

7. The liquid crystal display device according to claim 1, wherein the second polymer is a polymer obtained by radically polymerizing the at least one monomer.

8. The liquid crystal display device according to claim 1, wherein the at least one monomer represented by the above formula (2) includes at least one monomer represented by any of the following formulas (7-1) to (7-5),

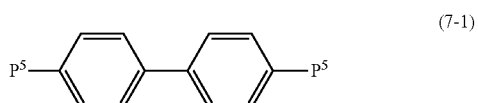
(7-1)

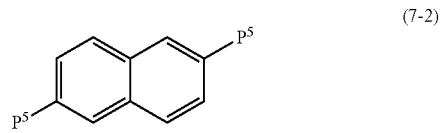
(7-2)

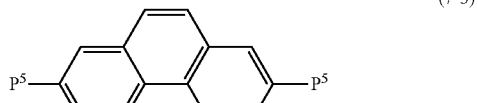
(7-3)

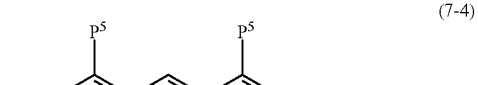
(7-4)

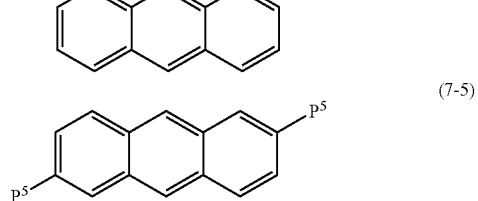
(7-5)

wherein $P^5$ represents a radically polymerizable group.

9. The liquid crystal display device according to claim 1, wherein the liquid crystal display device is in a liquid crystal driving mode of an MVA mode, a 4D-RTN mode, an FFS mode, or an IPS mode.

* * * * *